(12) United States Patent
Leamon

(10) Patent No.: US 9,149,797 B2
(45) Date of Patent: Oct. 6, 2015

(54) CATALYST PRODUCTION METHOD AND SYSTEM

(75) Inventor: David Leamon, Gibert, AZ (US)

(73) Assignee: SDCmaterials, Inc., Tempe, AZ (US)

(*) Notice: Subject to any disclaimer, the term of this patent is extended or adjusted under 35 U.S.C. 154(b) by 404 days.

(21) Appl. No.: 12/965,745

(22) Filed: Dec. 10, 2010

(65) Prior Publication Data

US 2011/0143916 A1 Jun. 16, 2011

Related U.S. Application Data

(60) Provisional application No. 61/284,329, filed on Dec. 15, 2009.

(51) Int. Cl.
*B01J 37/34* (2006.01)
*B01J 23/89* (2006.01)
(Continued)

(52) U.S. Cl.
CPC ............. *B01J 23/8926* (2013.01); *B01J 23/42* (2013.01); *B01J 35/0013* (2013.01); *B01J 37/00* (2013.01); *B01J 37/009* (2013.01);
(Continued)

(58) Field of Classification Search
CPC ......... C01B 31/086; B01J 37/34; B01J 31/06; B01J 35/0013; B01J 23/90; B01J 35/04; B01J 19/32; B01D 53/86; B01D 53/945; F01N 3/2828
USPC .............................................. 502/5; 977/902
See application file for complete search history.

(56) References Cited

U.S. PATENT DOCUMENTS 2,021,936 A 11/1935 Johnstone
2,284,554 A 5/1942 Beyerstedt ...................... 196/10
(Continued)

FOREIGN PATENT DOCUMENTS

CN 101301610 A 11/2008
DE 34 45 273 A1 6/1986
(Continued)

OTHER PUBLICATIONS

V. Martinez-Hansen et al. "Development of aligned carbon nanotubes layers over stainless steel mesh monoliths" 3rd International Conference on Structured Catalysts and Reactors, ICOSCAR-3, Ischia, Italy, Sep. 27-30, 2009.*
(Continued)

*Primary Examiner* — Colleen Dunn
*Assistant Examiner* — Haytham Soliman
(74) *Attorney, Agent, or Firm* — Morrison & Foerster LLP

(57) ABSTRACT

A method of producing a catalyst comprising: mixing catalytic particles and a solvent, thereby forming a mixture; performing a size distribution analysis on the mixture to determine a size distribution profile; repeating the mixing of the catalytic particles and the solvent in the mixture if the size distribution profile is below a threshold; centrifuging the mixture if the size distribution profile is at or above the threshold, thereby forming a supernate and a precipitate, wherein the supernate comprises a dispersion including the catalytic particles and the solvent; decanting the mixture, separating the supernate from the precipitate; determining the particle content of the separated supernate; determining a volume of the dispersion to be applied to a catalyst support based on one or more properties of the catalyst support; and impregnating the catalyst support with the catalytic particles in the dispersion by applying the volume of the dispersion to the catalyst support.

25 Claims, 3 Drawing Sheets

(51) Int. Cl.

| | | |
|---|---|---|
| *B01J 23/42* | (2006.01) | |
| *B01J 35/00* | (2006.01) | |
| *B01J 37/00* | (2006.01) | |
| *B01J 37/32* | (2006.01) | |
| *B28B 23/00* | (2006.01) | |
| *B32B 7/12* | (2006.01) | |
| *B32B 37/14* | (2006.01) | |
| *B82Y 30/00* | (2011.01) | |
| *B82Y 40/00* | (2011.01) | |
| *C23C 4/12* | (2006.01) | |
| *B01J 37/02* | (2006.01) | |

(52) U.S. Cl.
CPC ............ *B01J 37/0211* (2013.01); *B01J 37/32* (2013.01); *B01J 37/349* (2013.01); *B28B 23/0087* (2013.01); *B32B 7/12* (2013.01); *B32B 37/14* (2013.01); *B82Y 30/00* (2013.01); *B82Y 40/00* (2013.01); *C23C 4/127* (2013.01)

(56) References Cited

U.S. PATENT DOCUMENTS

| | | | |
|---|---|---|---|
| 2,419,042 A | 4/1947 | Todd | 202/205 |
| 2,519,531 A | 8/1950 | Worn | 230/95 |
| 2,562,753 A | 7/1951 | Trost | 241/39 |
| 2,689,780 A | 9/1954 | Rice | 23/106 |
| 3,001,402 A | 9/1961 | Koblin | 73/421.5 |
| 3,042,511 A | 7/1962 | Reding, Jr. | |
| 3,067,025 A | 12/1962 | Chisholm | 75/84.5 |
| 3,145,287 A | 8/1964 | Siebein et al. | |
| 3,178,121 A | 4/1965 | Wallace, Jr. | 241/5 |
| 3,179,782 A | 4/1965 | Matvay | |
| 3,181,947 A | 5/1965 | Vordahl | |
| 3,235,700 A | 2/1966 | Mondain-Monval et al. | |
| 3,313,908 A | 4/1967 | Unger et al. | |
| 3,387,110 A | 6/1968 | Wendler et al. | |
| 3,401,465 A | 9/1968 | Larwill | 34/57 |
| 3,450,916 A | 6/1969 | Kiernan | 313/231 |
| 3,457,788 A | 7/1969 | Miyajima | 73/422 |
| 3,520,656 A | 7/1970 | Yates et al. | |
| 3,537,513 A | 11/1970 | Austin | 165/70 |
| 3,552,653 A | 1/1971 | Inoue | |
| 3,617,358 A | 11/1971 | Dittrich | |
| 3,667,111 A | 6/1972 | Chartet | |
| 3,741,001 A | 6/1973 | Fletcher et al. | 73/28 |
| 3,752,172 A | 8/1973 | Cohen et al. | 137/12 |
| 3,761,360 A | 9/1973 | Auvil et al. | |
| 3,774,442 A | 11/1973 | Gustavsson | 73/28 |
| 3,804,034 A | 4/1974 | Stiglich, Jr. | |
| 3,830,756 A | 8/1974 | Sanchez et al. | |
| 3,857,744 A | 12/1974 | Moss | |
| 3,871,448 A | 3/1975 | Vann et al. | |
| 3,892,882 A | 7/1975 | Guest et al. | 427/34 |
| 3,914,573 A | 10/1975 | Muehlberger | 219/76 |
| 3,959,094 A | 5/1976 | Steinberg | |
| 3,959,420 A | 5/1976 | Geddes et al. | 261/112 |
| 3,969,482 A | 7/1976 | Teller | |
| 4,008,620 A | 2/1977 | Narato et al. | 73/421.5 A |
| 4,018,388 A | 4/1977 | Andrews | 241/39 |
| 4,021,021 A | 5/1977 | Hall et al. | |
| 4,127,760 A | 11/1978 | Meyer et al. | |
| 4,139,497 A | 2/1979 | Castor et al. | 252/470 |
| 4,146,654 A | 3/1979 | Guyonnet | |
| 4,157,316 A | 6/1979 | Thompson et al. | |
| 4,171,288 A | 10/1979 | Keith et al. | 252/462 |
| 4,174,298 A | 11/1979 | Antos | |
| 4,189,925 A | 2/1980 | Long | |
| 4,227,928 A | 10/1980 | Wang | |
| 4,248,387 A | 2/1981 | Andrews | 241/5 |
| 4,253,917 A | 3/1981 | Wang | |
| 4,260,649 A | 4/1981 | Dension et al. | |
| 4,284,609 A | 8/1981 | deVries | 423/242 |
| 4,315,874 A | 2/1982 | Ushida et al. | |
| 4,326,492 A | 4/1982 | Leibrand, Sr. et al. | |
| 4,344,779 A | 8/1982 | Isserlis | |
| 4,369,167 A | 1/1983 | Weir | |
| 4,388,274 A | 6/1983 | Rourke et al. | 422/177 |
| 4,419,331 A | 12/1983 | Montalvo | |
| 4,431,750 A | 2/1984 | McGinnis et al. | |
| 4,436,075 A | 3/1984 | Campbell et al. | 123/557 |
| 4,440,733 A | 4/1984 | Lawson et al. | |
| 4,458,138 A | 7/1984 | Adrian et al. | |
| 4,459,327 A | 7/1984 | Wang | |
| 4,505,945 A | 3/1985 | Dubust et al. | |
| 4,506,136 A | 3/1985 | Smyth et al. | |
| 4,513,149 A | 4/1985 | Gray et al. | 564/449 |
| 4,523,981 A | 6/1985 | Ang et al. | |
| 4,545,872 A | 10/1985 | Sammells et al. | |
| RE32,244 E | 9/1986 | Andersen | |
| 4,609,441 A | 9/1986 | Frese, Jr. et al. | |
| 4,610,857 A | 9/1986 | Ogawa et al. | |
| 4,616,779 A | 10/1986 | Serrano et al. | |
| 4,723,589 A | 2/1988 | Iyer et al. | |
| 4,731,517 A | 3/1988 | Cheney | |
| 4,751,021 A | 6/1988 | Mollon et al. | |
| 4,764,283 A | 8/1988 | Ashbrook et al. | 210/695 |
| 4,765,805 A | 8/1988 | Wahl et al. | |
| 4,824,624 A | 4/1989 | Palicka et al. | 264/67 |
| 4,836,084 A | 6/1989 | Vogelesang et al. | |
| 4,855,505 A | 8/1989 | Koll | 564/398 |
| 4,866,240 A | 9/1989 | Webber | 219/121.47 |
| 4,877,937 A | 10/1989 | Müller | |
| 4,885,038 A | 12/1989 | Anderson et al. | |
| 4,921,586 A | 5/1990 | Molter | |
| 4,970,364 A | 11/1990 | Müller | |
| 4,982,050 A | 1/1991 | Gammie et al. | |
| 4,983,555 A | 1/1991 | Roy et al. | 501/120 |
| 4,987,033 A | 1/1991 | Abkowitz et al. | 428/469 |
| 5,006,163 A | 4/1991 | Benn et al. | |
| 5,015,863 A | 5/1991 | Takeshima et al. | |
| 5,041,713 A | 8/1991 | Weidman | |
| 5,043,548 A | 8/1991 | Whitney et al. | 219/121.84 |
| 5,070,064 A | 12/1991 | Hsu et al. | |
| 5,073,193 A | 12/1991 | Chaklader et al. | 75/346 |
| 5,133,190 A | 7/1992 | Abdelmalek | |
| 5,151,296 A | 9/1992 | Tokunaga | |
| 5,157,007 A | 10/1992 | Domesle et al. | |
| 5,187,140 A | 2/1993 | Thorsteinson et al. | |
| 5,192,130 A | 3/1993 | Endo et al. | |
| 5,217,746 A | 6/1993 | Lenling et al. | |
| 5,225,656 A | 7/1993 | Frind | |
| 5,230,844 A | 7/1993 | Macaire et al. | |
| 5,233,153 A | 8/1993 | Coats | |
| 5,269,848 A | 12/1993 | Nakagawa | |
| 5,294,242 A | 3/1994 | Zurecki et al. | |
| 5,330,945 A | 7/1994 | Beckmeyer et al. | |
| 5,338,716 A | 8/1994 | Triplett et al. | |
| 5,369,241 A | 11/1994 | Taylor et al. | 219/121.47 |
| 5,371,049 A | 12/1994 | Moffett et al. | 501/89 |
| 5,372,629 A | 12/1994 | Anderson et al. | 75/332 |
| 5,392,797 A | 2/1995 | Welch | 134/108 |
| 5,436,080 A | 7/1995 | Inoue et al. | |
| 5,439,865 A | 8/1995 | Abe et al. | 502/333 |
| 5,442,153 A | 8/1995 | Marantz et al. | 219/121.47 |
| 5,452,854 A | 9/1995 | Keller | |
| 5,460,701 A | 10/1995 | Parker et al. | |
| 5,464,458 A | 11/1995 | Yamamoto | |
| 5,485,941 A | 1/1996 | Guyomard et al. | 222/1 |
| 5,486,675 A | 1/1996 | Taylor et al. | |
| 5,489,449 A | 2/1996 | Umeya et al. | |
| 5,534,149 A | 7/1996 | Birkenbeil et al. | 210/636 |
| 5,534,270 A | 7/1996 | De Castro | |
| 5,543,173 A | 8/1996 | Horn, Jr. et al. | |
| 5,553,507 A | 9/1996 | Basch et al. | 73/863.01 |
| 5,558,771 A | 9/1996 | Hagen et al. | |
| 5,562,966 A | 10/1996 | Clarke et al. | |
| 5,582,807 A | 12/1996 | Liao et al. | |
| 5,596,973 A | 1/1997 | Grice | |
| 5,611,896 A | 3/1997 | Swanepoel et al. | 204/169 |
| 5,630,322 A | 5/1997 | Heilmann et al. | 62/95 |
| 5,652,304 A | 7/1997 | Calderon et al. | |
| 5,714,644 A * | 2/1998 | Irgang et al. | 568/857 |
| 5,723,027 A | 3/1998 | Serole | |

(56) References Cited

U.S. PATENT DOCUMENTS

| | | | |
|---|---|---|---|
| 5,723,187 A | 3/1998 | Popoola et al. | |
| 5,726,414 A | 3/1998 | Kitahashi et al. | |
| 5,733,662 A | 3/1998 | Bogachek | |
| 5,749,938 A | 5/1998 | Coombs | 75/332 |
| 5,776,359 A | 7/1998 | Schultz et al. | 252/62.51 |
| 5,788,738 A | 8/1998 | Pirzada et al. | 75/331 |
| 5,804,155 A | 9/1998 | Farrauto et al. | |
| 5,811,187 A | 9/1998 | Anderson et al. | 428/403 |
| 5,837,959 A | 11/1998 | Muehlberger et al. | 219/121.47 |
| 5,851,507 A | 12/1998 | Pirzada et al. | 423/659 |
| 5,853,815 A | 12/1998 | Muehlberger | 427/446 |
| 5,858,470 A | 1/1999 | Bernecki et al. | |
| 5,884,473 A | 3/1999 | Noda et al. | |
| 5,905,000 A | 5/1999 | Yadav et al. | 429/33 |
| 5,928,806 A | 7/1999 | Olah et al. | |
| 5,935,293 A | 8/1999 | Detering et al. | 75/10.29 |
| 5,973,289 A | 10/1999 | Read et al. | |
| 5,989,648 A | 11/1999 | Phillips | 427/456 |
| 5,993,967 A | 11/1999 | Brotzman, Jr. et al. | 428/407 |
| 5,993,988 A | 11/1999 | Ohara et al. | 429/40 |
| 6,004,620 A | 12/1999 | Camm | |
| 6,012,647 A | 1/2000 | Ruta et al. | 239/132.1 |
| 6,033,781 A | 3/2000 | Brotzman, Jr. et al. | 428/405 |
| 6,045,765 A | 4/2000 | Nakatsuji et al. | |
| 6,059,853 A | 5/2000 | Coombs | 75/332 |
| 6,066,587 A | 5/2000 | Kurokawa et al. | |
| 6,084,197 A | 7/2000 | Fusaro, Jr. | |
| 6,093,306 A | 7/2000 | Hanrahan et al. | |
| 6,093,378 A | 7/2000 | Deeba et al. | |
| 6,102,106 A | 8/2000 | Manning et al. | 165/76 |
| 6,117,376 A | 9/2000 | Merkel | |
| 6,140,539 A | 10/2000 | Sander et al. | |
| 6,168,694 B1 | 1/2001 | Huang et al. | |
| 6,190,627 B1 | 2/2001 | Hoke et al. | |
| 6,213,049 B1 | 4/2001 | Yang | 118/723 |
| 6,214,195 B1 | 4/2001 | Yadav et al. | 205/334 |
| 6,228,904 B1 | 5/2001 | Yadav et al. | 523/210 |
| 6,254,940 B1 | 7/2001 | Pratsinis et al. | 427/562 |
| 6,261,484 B1 | 7/2001 | Phillips et al. | 264/5 |
| 6,267,864 B1 | 7/2001 | Yadav et al. | 205/341 |
| 6,322,756 B1 | 11/2001 | Arno et al. | |
| 6,342,465 B1 | 1/2002 | Klein et al. | |
| 6,344,271 B1 | 2/2002 | Yadav et al. | 428/402 |
| 6,362,449 B1 | 3/2002 | Hadidi et al. | |
| 6,379,419 B1 | 4/2002 | Celik et al. | 75/346 |
| 6,387,560 B1 | 5/2002 | Yadav et al. | 429/45 |
| 6,395,214 B1 | 5/2002 | Kear et al. | 264/434 |
| 6,398,843 B1 | 6/2002 | Tarrant | 75/249 |
| 6,399,030 B1 | 6/2002 | Nolan | |
| 6,409,851 B1 | 6/2002 | Sethuram et al. | 148/565 |
| 6,413,781 B1 | 7/2002 | Geis et al. | 436/178 |
| 6,416,818 B1 | 7/2002 | Aikens et al. | 427/383.1 |
| RE37,853 E | 9/2002 | Detering et al. | 75/10.19 |
| 6,444,009 B1 | 9/2002 | Liu et al. | 75/332 |
| 6,475,951 B1 * | 11/2002 | Domesle et al. | 502/325 |
| 6,488,904 B1 | 12/2002 | Cox et al. | |
| 6,491,423 B1 | 12/2002 | Skibo et al. | |
| 6,506,995 B1 | 1/2003 | Fusaro, Jr. et al. | |
| 6,517,800 B1 | 2/2003 | Cheng et al. | 423/447.1 |
| 6,524,662 B2 | 2/2003 | Jang et al. | 427/535 |
| 6,531,704 B2 | 3/2003 | Yadav et al. | 250/493.1 |
| 6,548,445 B1 | 4/2003 | Buysch et al. | |
| 6,554,609 B2 | 4/2003 | Yadav et al. | 432/9 |
| 6,562,304 B1 | 5/2003 | Mizrahi | |
| 6,562,495 B2 | 5/2003 | Yadav et al. | 429/12 |
| 6,569,393 B1 | 5/2003 | Hoke et al. | |
| 6,569,397 B1 | 5/2003 | Yadav et al. | 423/345 |
| 6,569,518 B2 | 5/2003 | Yadav et al. | 428/323 |
| 6,572,672 B2 | 6/2003 | Yadav et al. | 75/343 |
| 6,579,446 B1 | 6/2003 | Teran et al. | |
| 6,596,187 B2 | 7/2003 | Coll et al. | 216/56 |
| 6,603,038 B1 | 8/2003 | Hagemeyer et al. | 560/241.1 |
| 6,607,821 B2 | 8/2003 | Yadav et al. | 428/323 |
| 6,610,355 B2 | 8/2003 | Yadav et al. | |
| 6,623,559 B2 | 9/2003 | Huang | 117/87 |
| 6,635,357 B2 | 10/2003 | Moxson et al. | 428/548 |
| 6,641,775 B2 | 11/2003 | Vigliotti et al. | 264/618 |
| 6,652,822 B2 | 11/2003 | Phillips et al. | 423/290 |
| 6,652,967 B2 | 11/2003 | Yadav et al. | 428/403 |
| 6,669,823 B1 | 12/2003 | Sarkas et al. | 204/164 |
| 6,682,002 B2 | 1/2004 | Kyotani | 239/318 |
| 6,689,192 B1 | 2/2004 | Phillips et al. | 75/342 |
| 6,699,398 B1 | 3/2004 | Kim | 216/55 |
| 6,706,097 B2 | 3/2004 | Zornes | 96/153 |
| 6,706,660 B2 | 3/2004 | Park | |
| 6,710,207 B2 | 3/2004 | Bogan, Jr. et al. | |
| 6,713,176 B2 | 3/2004 | Yadav et al. | 428/402 |
| 6,716,525 B1 * | 4/2004 | Yadav et al. | 428/402 |
| 6,744,006 B2 | 6/2004 | Johnson et al. | |
| 6,746,791 B2 | 6/2004 | Yadav et al. | 429/30 |
| 6,772,584 B2 | 8/2004 | Chun et al. | 60/275 |
| 6,786,950 B2 | 9/2004 | Yadav et al. | 75/346 |
| 6,813,931 B2 | 11/2004 | Yadav et al. | 73/31.05 |
| 6,817,388 B2 | 11/2004 | Tsangaris et al. | 141/82 |
| 6,832,735 B2 | 12/2004 | Yadav et al. | 241/16 |
| 6,838,072 B1 | 1/2005 | Kong et al. | 423/594.2 |
| 6,841,509 B1 | 1/2005 | Hwang et al. | |
| 6,855,410 B2 | 2/2005 | Buckley | |
| 6,855,426 B2 | 2/2005 | Yadav | 428/403 |
| 6,855,749 B1 | 2/2005 | Yadav et al. | 523/105 |
| 6,858,170 B2 | 2/2005 | Van Thillo et al. | |
| 6,886,545 B1 | 5/2005 | Holm | 123/568.21 |
| 6,891,319 B2 | 5/2005 | Dean et al. | |
| 6,896,958 B1 | 5/2005 | Cayton et al. | 428/323 |
| 6,902,699 B2 | 6/2005 | Fritzemeier et al. | 419/38 |
| 6,916,872 B2 | 7/2005 | Yadav et al. | 524/430 |
| 6,919,065 B2 | 7/2005 | Zhou et al. | |
| 6,919,527 B2 | 7/2005 | Boulos et al. | 219/121.52 |
| 6,933,331 B2 | 8/2005 | Yadav et al. | 523/210 |
| 6,972,115 B1 | 12/2005 | Ballard | |
| 6,986,877 B2 | 1/2006 | Takikawa et al. | 423/447.3 |
| 6,994,837 B2 | 2/2006 | Boulos et al. | |
| 7,007,872 B2 | 3/2006 | Yadav et al. | 241/1 |
| 7,022,305 B2 | 4/2006 | Drumm et al. | |
| 7,052,777 B2 | 5/2006 | Brotzman, Jr. et al. | 428/570 |
| 7,073,559 B2 | 7/2006 | O'Larey et al. | 164/76.1 |
| 7,074,364 B2 | 7/2006 | Jähn et al. | |
| 7,081,267 B2 | 7/2006 | Yadav | 427/115 |
| 7,101,819 B2 | 9/2006 | Rosenflanz et al. | 501/10 |
| 7,147,544 B2 | 12/2006 | Rosenflanz | 451/28 |
| 7,147,894 B2 | 12/2006 | Zhou et al. | 427/256 |
| 7,166,198 B2 | 1/2007 | Van Der Walt et al. | 204/165 |
| 7,166,663 B2 | 1/2007 | Cayton et al. | 524/430 |
| 7,172,649 B2 | 2/2007 | Conrad et al. | 106/35 |
| 7,172,790 B2 | 2/2007 | Koulik et al. | 427/212 |
| 7,178,747 B2 | 2/2007 | Yadav et al. | 241/23 |
| 7,208,126 B2 | 4/2007 | Musick et al. | 423/69 |
| 7,211,236 B2 | 5/2007 | Stark et al. | 423/592.1 |
| 7,217,407 B2 | 5/2007 | Zhang | 423/610 |
| 7,220,398 B2 | 5/2007 | Sutorik et al. | 423/593.1 |
| 7,255,498 B2 | 8/2007 | Bush et al. | |
| 7,265,076 B2 | 9/2007 | Taguchi et al. | |
| 7,282,167 B2 | 10/2007 | Carpenter | |
| 7,307,195 B2 | 12/2007 | Polverejan et al. | 585/443 |
| 7,323,655 B2 | 1/2008 | Kim | 219/121.43 |
| 7,384,447 B2 | 6/2008 | Kodas et al. | 75/332 |
| 7,402,899 B1 | 7/2008 | Whiting et al. | |
| 7,417,008 B2 | 8/2008 | Richards et al. | |
| 7,494,527 B2 | 2/2009 | Jurewicz et al. | 75/346 |
| 7,507,495 B2 | 3/2009 | Wang et al. | |
| 7,517,826 B2 | 4/2009 | Fujdala et al. | |
| 7,534,738 B2 | 5/2009 | Fujdala et al. | |
| 7,541,012 B2 | 6/2009 | Yeung et al. | |
| 7,541,310 B2 | 6/2009 | Espinoza et al. | |
| 7,557,324 B2 | 7/2009 | Nylen et al. | |
| 7,572,315 B2 | 8/2009 | Boulos et al. | 75/336 |
| 7,576,029 B2 | 8/2009 | Saito et al. | |
| 7,576,031 B2 | 8/2009 | Beutel et al. | |
| 7,604,843 B1 | 10/2009 | Robinson et al. | |
| 7,611,686 B2 | 11/2009 | Alekseeva et al. | 423/276 |
| 7,615,097 B2 | 11/2009 | McKechnie et al. | 75/346 |
| 7,618,919 B2 | 11/2009 | Shimazu et al. | |
| 7,622,693 B2 | 11/2009 | Foret | 219/121.43 |
| 7,632,775 B2 | 12/2009 | Zhou et al. | |

(56) References Cited

U.S. PATENT DOCUMENTS

| | | |
|---|---|---|
| 7,635,218 B1 | 12/2009 | Lott |
| 7,674,744 B2 | 3/2010 | Shiratori et al. |
| 7,678,419 B2 | 3/2010 | Kevwitch et al. |
| 7,704,369 B2 | 4/2010 | Olah et al. |
| 7,709,411 B2 | 5/2010 | Zhou et al. |
| 7,709,414 B2 | 5/2010 | Fujdala et al. |
| 7,745,367 B2 | 6/2010 | Fujdala et al. |
| 7,750,265 B2 | 7/2010 | Belashchenko |
| 7,759,279 B2 | 7/2010 | Shiratori et al. |
| 7,759,281 B2 | 7/2010 | Kezuka et al. |
| 7,803,210 B2 | 9/2010 | Sekine et al. ............... 75/334 |
| 7,842,515 B2 | 11/2010 | Zou et al. |
| 7,851,405 B2 | 12/2010 | Wakamatsu et al. |
| 7,874,239 B2 | 1/2011 | Howland |
| 7,875,573 B2 | 1/2011 | Beutel et al. |
| 7,897,127 B2 | 3/2011 | Layman et al. |
| 7,902,104 B2 | 3/2011 | Kalck et al. |
| 7,905,942 B1 | 3/2011 | Layman |
| 7,935,655 B2 | 5/2011 | Tolmachev |
| 8,003,020 B2 | 8/2011 | Jankowiak et al. |
| 8,051,724 B1 | 11/2011 | Layman et al. |
| 8,076,258 B1 | 12/2011 | Biberger |
| 8,080,494 B2 | 12/2011 | Yasuda et al. |
| 8,089,495 B2 | 1/2012 | Keller |
| 8,129,654 B2 | 3/2012 | Lee et al. |
| 8,142,619 B2 | 3/2012 | Layman et al. |
| 8,168,561 B2 | 5/2012 | Virkar |
| 8,173,572 B2 | 5/2012 | Feaviour |
| 8,211,392 B2 | 7/2012 | Grubert et al. |
| 8,258,070 B2 | 9/2012 | Fujdala et al. |
| 8,278,240 B2 | 10/2012 | Tange et al. |
| 8,294,060 B2 | 10/2012 | Mohanty et al. |
| 8,309,489 B2 | 11/2012 | Cuenya et al. |
| 8,349,761 B2 | 1/2013 | Xia et al. |
| 8,404,611 B2 | 3/2013 | Nakamura et al. |
| 8,524,631 B2 | 9/2013 | Biberger |
| 8,557,727 B2 | 10/2013 | Yin et al. |
| 8,574,408 B2 | 11/2013 | Layman |
| 8,574,520 B2 | 11/2013 | Koplin et al. |
| 8,652,992 B2 | 2/2014 | Yin et al. |
| 8,669,202 B2 | 3/2014 | van den Hoek et al. |
| 8,679,433 B2 | 3/2014 | Yin et al. |
| 2001/0004009 A1 | 6/2001 | MacKelvie |
| 2001/0042802 A1 | 11/2001 | Youds .......................... 241/5 |
| 2001/0055554 A1 | 12/2001 | Hoke et al. |
| 2002/0018815 A1 | 2/2002 | Sievers et al. ............. 424/489 |
| 2002/0068026 A1 | 6/2002 | Murrell et al. ............. 422/211 |
| 2002/0071800 A1 | 6/2002 | Hoke et al. |
| 2002/0079620 A1 | 6/2002 | DuBuis et al. ........... 264/328.14 |
| 2002/0100751 A1 | 8/2002 | Carr ............................ 219/209 |
| 2002/0102674 A1 | 8/2002 | Anderson ................... 435/174 |
| 2002/0131914 A1 | 9/2002 | Sung |
| 2002/0143417 A1 | 10/2002 | Ito et al. |
| 2002/0168466 A1 | 11/2002 | Tapphorn et al. |
| 2002/0182735 A1 | 12/2002 | Kibby et al. |
| 2002/0183191 A1 | 12/2002 | Faber et al. |
| 2002/0192129 A1 | 12/2002 | Shamouilian et al. |
| 2003/0036786 A1 | 2/2003 | Duren et al. ................. 607/96 |
| 2003/0042232 A1 | 3/2003 | Shimazu .................. 219/121.47 |
| 2003/0047617 A1 | 3/2003 | Shanmugham et al. |
| 2003/0066800 A1 | 4/2003 | Saim et al. ..................... 264/5 |
| 2003/0085663 A1 | 5/2003 | Horsky |
| 2003/0102099 A1 | 6/2003 | Yadav et al. |
| 2003/0108459 A1 | 6/2003 | Wu et al. ................... 422/186.04 |
| 2003/0110931 A1 | 6/2003 | Aghajanian et al. |
| 2003/0129098 A1 | 7/2003 | Endo et al. |
| 2003/0139288 A1 | 7/2003 | Cai et al. |
| 2003/0143153 A1 | 7/2003 | Boulos et al. |
| 2003/0172772 A1 | 9/2003 | Sethuram et al. ............. 501/87 |
| 2003/0223546 A1 | 12/2003 | McGregor et al. ........... 378/143 |
| 2004/0009118 A1 | 1/2004 | Phillips et al. ............. 423/592.1 |
| 2004/0023302 A1 | 2/2004 | Archibald et al. ............ 435/7.1 |
| 2004/0023453 A1 | 2/2004 | Xu et al. .................... 257/369 |
| 2004/0077494 A1 | 4/2004 | LaBarge et al. .............. 502/303 |
| 2004/0103751 A1 | 6/2004 | Joseph et al. ............... 75/10.19 |
| 2004/0109523 A1 | 6/2004 | Singh et al. |
| 2004/0119064 A1 | 6/2004 | Narayan et al. |
| 2004/0127586 A1 | 7/2004 | Jin et al. |
| 2004/0129222 A1 | 7/2004 | Nylen et al. |
| 2004/0166036 A1 | 8/2004 | Chen et al. |
| 2004/0167009 A1 | 8/2004 | Kuntz et al. .................. 501/95.2 |
| 2004/0176246 A1 | 9/2004 | Shirk et al. .................. 502/439 |
| 2004/0208805 A1 | 10/2004 | Fincke et al. |
| 2004/0213998 A1 | 10/2004 | Hearley et al. .............. 428/402 |
| 2004/0235657 A1 | 11/2004 | Xiao et al. |
| 2004/0238345 A1 | 12/2004 | Koulik et al. |
| 2004/0251017 A1 | 12/2004 | Pillion et al. ................ 165/289 |
| 2004/0251241 A1 | 12/2004 | Blutke et al. |
| 2005/0000321 A1 | 1/2005 | O'Larey et al. ................ 75/952 |
| 2005/0000950 A1 | 1/2005 | Schroder et al. ......... 219/121.59 |
| 2005/0058797 A1* | 3/2005 | Sen et al. .................. 428/36.91 |
| 2005/0066805 A1 | 3/2005 | Park et al. |
| 2005/0070431 A1 | 3/2005 | Alvin et al. |
| 2005/0077034 A1 | 4/2005 | King ........................... 165/163 |
| 2005/0097988 A1 | 5/2005 | Kodas et al. .................. 75/332 |
| 2005/0106865 A1 | 5/2005 | Chung et al. |
| 2005/0133121 A1 | 6/2005 | Subramanian et al. |
| 2005/0153069 A1 | 7/2005 | Tapphorn et al. |
| 2005/0163673 A1 | 7/2005 | Johnson et al. |
| 2005/0199739 A1 | 9/2005 | Kuroda et al. ................. 239/13 |
| 2005/0211018 A1 | 9/2005 | Jurewicz et al. |
| 2005/0220695 A1 | 10/2005 | Abatzoglou et al. .......... 423/445 |
| 2005/0227864 A1 | 10/2005 | Sutorik et al. |
| 2005/0233380 A1 | 10/2005 | Persiri et al. .................. 435/7.1 |
| 2005/0240069 A1 | 10/2005 | Polverejan et al. ........... 585/444 |
| 2005/0258766 A1 | 11/2005 | Kim ......................... 315/111.21 |
| 2005/0274646 A1 | 12/2005 | Lawson et al. |
| 2005/0275143 A1 | 12/2005 | Toth |
| 2006/0043651 A1 | 3/2006 | Yamamoto et al. |
| 2006/0051505 A1 | 3/2006 | Kortshagen et al. .......... 427/212 |
| 2006/0068989 A1 | 3/2006 | Ninomiya et al. ............ 502/339 |
| 2006/0094595 A1 | 5/2006 | Labarge |
| 2006/0096393 A1 | 5/2006 | Pesiri |
| 2006/0105910 A1 | 5/2006 | Zhou et al. ................... 502/338 |
| 2006/0108332 A1 | 5/2006 | Belashchenko .......... 219/121.47 |
| 2006/0153728 A1 | 7/2006 | Schoenung et al. ............ 419/32 |
| 2006/0153765 A1 | 7/2006 | Pham-Huu et al. ........... 423/345 |
| 2006/0159596 A1 | 7/2006 | De La Veaux et al. ........ 422/151 |
| 2006/0166809 A1 | 7/2006 | Malek et al. |
| 2006/0211569 A1 | 9/2006 | Dang et al. |
| 2006/0213326 A1 | 9/2006 | Gollob et al. |
| 2006/0222780 A1 | 10/2006 | Gurevich et al. |
| 2006/0231525 A1 | 10/2006 | Asakawa et al. .............. 216/56 |
| 2007/0020167 A1* | 1/2007 | Han et al. ................... 423/447.3 |
| 2007/0044513 A1 | 3/2007 | Kear et al. |
| 2007/0048206 A1 | 3/2007 | Hung et al. ................... 423/335 |
| 2007/0049484 A1 | 3/2007 | Kear et al. |
| 2007/0063364 A1 | 3/2007 | Hsiao et al. ..................... 264/5 |
| 2007/0084308 A1 | 4/2007 | Nakamura et al. .............. 75/346 |
| 2007/0084834 A1 | 4/2007 | Hanus et al. ................ 219/121.5 |
| 2007/0087934 A1 | 4/2007 | Martens et al. ................ 502/214 |
| 2007/0092768 A1 | 4/2007 | Lee et al. |
| 2007/0153390 A1 | 7/2007 | Nakamura et al. |
| 2007/0161506 A1 | 7/2007 | Saito et al. |
| 2007/0163385 A1 | 7/2007 | Takahashi et al. |
| 2007/0172721 A1 | 7/2007 | Pak et al. |
| 2007/0173403 A1 | 7/2007 | Koike et al. ................... 502/300 |
| 2007/0178673 A1 | 8/2007 | Gole et al. |
| 2007/0221404 A1 | 9/2007 | Das et al. |
| 2007/0253874 A1 | 11/2007 | Foret ......................... 422/186.07 |
| 2007/0266825 A1 | 11/2007 | Ripley et al. |
| 2007/0292321 A1 | 12/2007 | Plischke et al. .............. 422/198 |
| 2008/0006954 A1 | 1/2008 | Yubuta et al. |
| 2008/0026041 A1 | 1/2008 | Tepper et al. |
| 2008/0031806 A1 | 2/2008 | Gavenonis et al. |
| 2008/0038578 A1 | 2/2008 | Li |
| 2008/0045405 A1 | 2/2008 | Beutel et al. |
| 2008/0047261 A1 | 2/2008 | Han et al. |
| 2008/0057212 A1 | 3/2008 | Dorier et al. |
| 2008/0064769 A1 | 3/2008 | Sato et al. |
| 2008/0104735 A1 | 5/2008 | Howland |
| 2008/0105083 A1 | 5/2008 | Nakamura et al. ............. 75/255 |
| 2008/0116178 A1 | 5/2008 | Weidman .................. 219/121.47 |
| 2008/0125308 A1 | 5/2008 | Fujdala et al. |

(56) References Cited

U.S. PATENT DOCUMENTS

| | | |
|---|---|---|
| 2008/0125313 A1 | 5/2008 | Fujdala et al. |
| 2008/0138651 A1 | 6/2008 | Doi et al. |
| 2008/0175936 A1 | 7/2008 | Tokita et al. |
| 2008/0187714 A1 | 8/2008 | Wakamatsu et al. |
| 2008/0206562 A1 | 8/2008 | Stucky et al. |
| 2008/0207858 A1 | 8/2008 | Kowaleski et al. ........... 526/176 |
| 2008/0248704 A1 | 10/2008 | Mathis et al. |
| 2008/0274344 A1 | 11/2008 | Vieth et al. |
| 2008/0277092 A1 | 11/2008 | Layman et al. |
| 2008/0277264 A1 | 11/2008 | Sprague |
| 2008/0277266 A1 | 11/2008 | Layman et al. |
| 2008/0277267 A1 | 11/2008 | Biberger et al. |
| 2008/0277268 A1 | 11/2008 | Layman |
| 2008/0277269 A1 | 11/2008 | Layman et al. |
| 2008/0277270 A1 | 11/2008 | Biberger et al. |
| 2008/0277271 A1 | 11/2008 | Layman |
| 2008/0280049 A1 | 11/2008 | Kevwitch et al. |
| 2008/0280751 A1 | 11/2008 | Harutyunyan et al. |
| 2008/0280756 A1 | 11/2008 | Biberger |
| 2008/0283411 A1 | 11/2008 | Eastman et al. |
| 2008/0283498 A1 | 11/2008 | Yamazaki |
| 2008/0307960 A1 | 12/2008 | Hendrickson et al. |
| 2009/0010801 A1 | 1/2009 | Murphy et al. |
| 2009/0018008 A1 | 1/2009 | Jankowiak et al. |
| 2009/0054230 A1 | 2/2009 | Veeraraghavan et al. |
| 2009/0081092 A1 | 3/2009 | Yang et al. |
| 2009/0088585 A1 | 4/2009 | Schammel et al. |
| 2009/0092887 A1 | 4/2009 | McGrath et al. |
| 2009/0098402 A1 | 4/2009 | Kang et al. |
| 2009/0114568 A1 | 5/2009 | Trevino et al. |
| 2009/0162991 A1 | 6/2009 | Beneyton et al. |
| 2009/0168506 A1 | 7/2009 | Han et al. |
| 2009/0170242 A1 | 7/2009 | Lin et al. |
| 2009/0181474 A1 | 7/2009 | Nagai |
| 2009/0200180 A1 | 8/2009 | Capote et al. |
| 2009/0208367 A1 | 8/2009 | Calio et al. |
| 2009/0209408 A1 | 8/2009 | Kitamura et al. |
| 2009/0223410 A1 | 9/2009 | Jun et al. |
| 2009/0253037 A1 | 10/2009 | Park et al. |
| 2009/0274897 A1 | 11/2009 | Kaner et al. |
| 2009/0274903 A1 | 11/2009 | Addiego |
| 2009/0286899 A1 | 11/2009 | Hofmann et al. |
| 2009/0320449 A1 | 12/2009 | Beutel et al. |
| 2009/0324468 A1 | 12/2009 | Golden et al. |
| 2010/0050868 A1 | 3/2010 | Kuznicki et al. |
| 2010/0089002 A1 | 4/2010 | Merkel |
| 2010/0092358 A1 | 4/2010 | Koegel et al. |
| 2010/0124514 A1 | 5/2010 | Chelluri et al. |
| 2010/0166629 A1 | 7/2010 | Deeba |
| 2010/0180581 A1 | 7/2010 | Grubert et al. |
| 2010/0180582 A1 | 7/2010 | Mueller-Stach et al. |
| 2010/0186375 A1 | 7/2010 | Kazi et al. |
| 2010/0240525 A1 | 9/2010 | Golden et al. |
| 2010/0275781 A1 | 11/2010 | Tsangaris et al. |
| 2010/0323118 A1 | 12/2010 | Mohanty et al. |
| 2011/0006463 A1 | 1/2011 | Layman |
| 2011/0030346 A1 | 2/2011 | Neubauer et al. |
| 2011/0049045 A1 | 3/2011 | Hurt et al. |
| 2011/0052467 A1 | 3/2011 | Chase et al. |
| 2011/0143041 A1 | 6/2011 | Layman et al. |
| 2011/0143915 A1 | 6/2011 | Yin et al. |
| 2011/0143916 A1 | 6/2011 | Leamon |
| 2011/0143926 A1 | 6/2011 | Yin et al. |
| 2011/0143930 A1 | 6/2011 | Yin et al. |
| 2011/0143933 A1 | 6/2011 | Yin et al. |
| 2011/0144382 A1 | 6/2011 | Yin et al. |
| 2011/0152550 A1 | 6/2011 | Grey et al. |
| 2011/0158871 A1 | 6/2011 | Arnold et al. |
| 2011/0174604 A1 | 7/2011 | Duesel et al. |
| 2011/0243808 A1 | 10/2011 | Fossey et al. |
| 2011/0245073 A1 | 10/2011 | Oljaca et al. |
| 2011/0247336 A9 | 10/2011 | Farsad et al. |
| 2011/0305612 A1 | 12/2011 | Müller-Stach et al. |
| 2012/0023909 A1 | 2/2012 | Lambert et al. |
| 2012/0045373 A1 | 2/2012 | Biberger |
| 2012/0063963 A1 | 3/2012 | Watanabe et al. |
| 2012/0097033 A1 | 4/2012 | Arnold et al. |
| 2012/0122660 A1 | 5/2012 | Andersen et al. |
| 2012/0124974 A1 | 5/2012 | Li et al. |
| 2012/0171098 A1 | 7/2012 | Hung et al. |
| 2012/0214666 A1 | 8/2012 | van den Hoek et al. |
| 2012/0263633 A1 | 10/2012 | Koplin et al. |
| 2012/0308467 A1 | 12/2012 | Carpenter et al. |
| 2012/0313269 A1 | 12/2012 | Kear et al. |
| 2013/0034472 A1 | 2/2013 | Cantrell et al. |
| 2013/0079216 A1 | 3/2013 | Biberger et al. |
| 2013/0125970 A1 | 5/2013 | Ko et al. |
| 2013/0213018 A1 | 8/2013 | Yin et al. |
| 2013/0280528 A1 | 10/2013 | Biberger |
| 2013/0281288 A1 | 10/2013 | Biberger et al. |
| 2013/0294989 A1 | 11/2013 | Koch et al. |
| 2013/0316896 A1 | 11/2013 | Biberger |
| 2013/0331257 A1 | 12/2013 | Barcikowski et al. |
| 2013/0345047 A1 | 12/2013 | Biberger et al. |
| 2014/0018230 A1 | 1/2014 | Yin et al. |
| 2014/0120355 A1 | 5/2014 | Biberger |
| 2014/0128245 A1 | 5/2014 | Yin et al. |
| 2014/0140909 A1 | 5/2014 | Qi et al. |
| 2014/0148331 A1 | 5/2014 | Biberger et al. |
| 2014/0161693 A1 | 6/2014 | Brown et al. |
| 2014/0209451 A1 | 7/2014 | Biberger et al. |
| 2014/0228201 A1 | 8/2014 | Mendoza et al. |
| 2014/0243187 A1 | 8/2014 | Yin et al. |
| 2014/0249021 A1 | 9/2014 | van den Hoek et al. |
| 2014/0252270 A1 | 9/2014 | Lehman, Jr. |
| 2014/0263190 A1 | 9/2014 | Biberger et al. |
| 2014/0318318 A1 | 10/2014 | Layman et al. |
| 2014/0338519 A1 | 11/2014 | Biberger |

FOREIGN PATENT DOCUMENTS

| | | | |
|---|---|---|---|
| EP | 0 347 386 A1 | 12/1989 | |
| EP | 0 385 742 A1 | 9/1990 | |
| EP | 1 134 302 A1 | 9/2001 | |
| EP | 1 256 378 A2 | 11/2002 | |
| EP | 1 619 168 A1 | 1/2006 | |
| EP | 1 790 612 A1 | 5/2007 | |
| EP | 1 955 765 A1 | 8/2008 | |
| GB | 1 307 941 | 2/1973 | |
| JP | 49-31571 A | 3/1974 | |
| JP | 56-146804 | 11/1981 | ................ B22F 9/08 |
| JP | 61-086815 A | 5/1986 | |
| JP | 62-102827 A | 5/1987 | |
| JP | 63-214342 A | 9/1988 | |
| JP | 1-164795 A | 6/1989 | |
| JP | 2-6339 A | 1/1990 | |
| JP | 3-226509 A | 10/1991 | |
| JP | 5-193909 A | 8/1993 | |
| JP | 05-228361 A | 9/1993 | |
| JP | 05-324094 A | 12/1993 | |
| JP | 6-93309 A | 4/1994 | |
| JP | 6-135797 A | 5/1994 | |
| JP | 6-172820 A | 6/1994 | |
| JP | 6-272012 A | 9/1994 | |
| JP | H6-065772 | 9/1994 | |
| JP | 7031873 A | 2/1995 | ................ B01J 19/08 |
| JP | 7-138020 A | 5/1995 | |
| JP | 7-207381 A | 8/1995 | |
| JP | 07-256116 | 10/1995 | |
| JP | 8-158033 A | 6/1996 | |
| JP | 8-215576 A | 8/1996 | |
| JP | 8-217420 A | 8/1996 | |
| JP | 9-141087 A | 6/1997 | |
| JP | 10-130810 A | 5/1998 | |
| JP | 10-249198 A | 9/1998 | |
| JP | 11-502760 A | 3/1999 | |
| JP | 2000-220978 A | 8/2000 | |
| JP | 2002-88486 A | 3/2002 | |
| JP | 2002-241812 A | 8/2002 | |
| JP | 2002-336688 A | 11/2002 | |
| JP | 2003-126694 A | 5/2003 | |
| JP | 2004-233007 A | 8/2004 | |
| JP | 2004-249206 A | 9/2004 | |
| JP | 2004-290730 A | 10/2004 | |

(56) References Cited

FOREIGN PATENT DOCUMENTS

| | | | | |
|---|---|---|---|---|
| JP | 2005-503250 A | 2/2005 | | |
| JP | 2005-122621 A | 5/2005 | | |
| JP | 2005-218937 A | 8/2005 | | |
| JP | 2005-342615 A | 12/2005 | | |
| JP | 2006-001779 A | 1/2006 | | |
| JP | 2006-508885 A | 3/2006 | | |
| JP | 2006-87965 A | 4/2006 | | |
| JP | 2006-247446 A | 9/2006 | | |
| JP | 2006-260385 A | 9/2006 | | |
| JP | 2006-326554 A | 12/2006 | | |
| JP | 2007-29859 A | 2/2007 | | |
| JP | 2007-44585 A | 2/2007 | | |
| JP | 2007-46162 A | 2/2007 | | |
| JP | 2007-138287 A | 6/2007 | | |
| JP | 2007-203129 A | 8/2007 | | |
| SU | 493241 | 3/1976 | | |
| TW | 200611449 | 4/2006 | | |
| TW | 201023207 | 6/2010 | | |
| WO | WO-96/28577 A1 | 9/1996 | | |
| WO | WO-00/72965 A1 | 12/2000 | | |
| WO | WO 02/092503 A1 | 11/2002 | ............ | C01B 21/064 |
| WO | WO-03/094195 A1 | 11/2003 | | |
| WO | WO 2004/052778 A2 | 6/2004 | .............. | C01B 13/28 |
| WO | WO-2005/063390 A1 | 7/2005 | | |
| WO | WO 2006/079213 A1 | 8/2006 | ................. | B01J 2/04 |
| WO | WO-2006/096205 A2 | 9/2006 | | |
| WO | WO-2007/144447 A1 | 12/2007 | | |
| WO | WO-2008/092478 A1 | 8/2008 | | |
| WO | WO-2008/130451 A2 | 10/2008 | | |
| WO | WO-2008/130451 A3 | 10/2008 | | |
| WO | WO-2009/017479 A1 | 2/2009 | | |
| WO | WO-2011/081833 A1 | 7/2011 | | |
| WO | WO-2012/028695 A2 | 3/2012 | | |
| WO | WO-2013/028575 A1 | 2/2013 | | |
| WO | WO-2013/093597 A2 | 6/2013 | | |
| WO | WO-2013/151557 A1 | 10/2013 | | |

OTHER PUBLICATIONS

Emmanuel Lamouroux et. al "Identification of key parameters for the selective growth of single or double wall carbon nanotubes on FeMo/Al2O3 CVD catalysts" vol. 323, Apr. 30, 2007, pp. 162-173.*

Bateman, James E. et al., "Alkylation of Porous Silicon by Direct Reaction with Alkenes and Alkynes," Angew. Chem Int. Ed., Dec. 17, 1998, 37, No. 19, pp. 2683-2685.

Langner, Alexander et al., "Controlled Silicon Surface Functionalization by Alkene Hydrosilylation," J. Am. Chem. Soc., Aug. 25, 2005, 127, pp. 12798-12799.

Liu, Shu-Man et al., "Enhanced Photoluminescence from Si Nanoorganosols by Functionalization with Alkenes and Their Size Evolution," Chem. Mater., Jan. 13, 2006, 18,pp. 637-642.

Fojtik, Anton, "Surface Chemistry of Luminescent Colloidal Silicon Nanoparticles," J. Phys. Chem. B., Jan. 13, 2006, pp. 1994-1998.

Li, Dejin et al., "Environmentally Responsive "Hairy" Nanoparticles: Mixed Homopolymer Brushes on Silica Nanoparticles Synthesized by Living Radical Polymerization Techniques," J.Am. Chem. Soc., Apr. 9, 2005, 127,pp. 6248-6256.

Neiner, Doinita, "Low-Temperature Solution Route to Macroscopic Amounts of Hydrogen Terminated Silicon Nanoparticles," J. Am. Chem. Soc., Aug. 5, 2006, 128, pp. 11016-11017.

Fojtik, Anton et al., "Luminescent Colloidal Silicon Particles,"Chemical Physics Letters 221, Apr. 29, 1994, pp. 363-367.

Netzer, Lucy et al., "A New Approach to Construction of Artificial Monolayer Assemblies," J. Am. Chem. Soc., 1983, 105, pp. 674-676.

Chen, H.-S. et al., "On the Photoluminescence of Si Nanoparticles," Mater. Phys. Mech. 4, Jul. 3, 2001, pp. 62-66.

Kwon, Young-Soon et al., "Passivation Process for Superfine Aluminum Powders Obtained by Electrical Explosion of Wires," Applied Surface Science 211. Apr. 30, 2003, pp. 57-67.

Liao, Ying-Chih et al., "Self-Assembly of Organic Monolayers on Aerosolized Silicon Nanoparticles," J.Am. Chem. Soc., Jun. 27, 2006, 128, pp. 9061-9065.

Zou, Jing et al., "Solution Synthesis of Ultrastable Luminescent Siloxane-Coated Silicon Nanoparticles," Nano Letters, Jun. 4, 2004, vol. 4, No. 7, pp. 1181-1186.

Tao, Yu-Tai, "Structural Comparison of Self-Assembled Monolayers of n-Alkanoic Acids on the surfaces of Silver, Copper, and Aluminum," J. Am. Chem. Soc., May 1993, 115, pp. 4350-4358.

Sailor, Michael et al., "Surface Chemistry of Luminescent Silicon Nanocrystallites," Adv. Mater, 1997, 9, No. 10, pp. 783-793.

Li, Xuegeng et al., "Surface Functionalization of Silicon Nanoparticles Produced by Laser-Driven Pyrolysis of Silane Followed by HF-HNO3 Etching," Langmuir, May 25, 2004, pp. 4720-4727.

Carrot, Geraldine et al., "Surface-Initiated Ring-Opening Polymerization: A Versatile Method for Nanoparticle Ordering," Macromolecules, Sep. 17, 2002, 35, pp. 8400-8404.

Jouet, R. Jason et al., "Surface Passivation of Bare Aluminum Nanoparticles Using Perfluoroalkyl Carboxylic Acids," Chem. Mater., Jan. 25, 2005, 17, pp. 2987-2996.

Yoshida, Toyonobu, "The Future of Thermal Plasma Processing for Coating," Pure & Appl. Chem., vol. 66, No. 6, 1994, pp. 1223-1230.

Kim, Namyong Y. et al., "Thermal Derivatization of Porous Silicon with Alcohols," J. Am. Chem. Soc., Mar. 5, 1997, 119, pp. 2297-2298.

Hua, Fengjun et al., "Organically Capped Silicon Nanoparticles with Blue Photoluminescence Prepared by Hydrosilylation Followed by Oxidation," Langmuir, Mar. 2006, pp. 4363-4370.

Stiles, A.B., Catalyst Supports and Supported Catalysts, Manufacture of Carbon-Supported Metal Catalysts, pp. 125-132, published Jan. 1, 1987, Butterworth Publishers, 80 Montvale Ave., Stoneham, MA 02180.

Derwent English Abstract for publication No. SU 193241 A, Application No. 1973SU1943286 filed on Jul. 2, 1973, published on Mar. 1, 1976, entitled "Catalyst for Ammonia Synthesis Contains Oxides of Aluminium, Potassium, Calcium, Iron and Nickel Oxide for Increased Activity," 3 pgs.

A. Gutsch et al., "Gas-Phase Production of Nanoparticles", Kona No. 20, 2002, pp. 24-37.

Dr. Heike Mühlenweg et al., "Gas-Phase Reactions—Open Up New Roads to Nanoproducts", Degussa ScienceNewsletter No. 08, 2004, pp. 12-16.

Coating Generation: Vaporization of Particles in Plasma Spraying and Splat Formation, M. Vardelle, A. Vardelle, K-I li, P. Fauchais, Universite de Limoges, 123 Avenue A. Thomas 87000, Limoges, F. , Pure & Chem, vol. 68, No. 5, pp. 1093-1099, 1996.

H. Konrad et al., "Nanostructured Cu-Bi Alloys Prepared by Co-Evaporation in a Continuous Gas Flow," NanoStructured Materials, vol. 7, No. 6, 1996, pp. 605-610.

Kenvin et al. "Supported Catalysts Prepared from Mononuclear Copper Complexes: Catalytic Properties", Journal of Catalysis, pp. 81-91, (1992).

J. Heberlein, "New Approaches in Thermal Plasma Technology", Pure Appl. Chem., vol. 74, No. 3, 2002, pp. 327-335.

M.Vardelle et al., "Experimental Investigation of Powder Vaporization in Thermal Plasma Jets," Plasma Chemistry and Plasma Processing, vol. 11, No. 2, Jun. 1991, pp. 185-201.

National Aeronautics and Space Administration, "Enthalpy", http://www.grc.nasa.gov/WWW/K-12/airplane/enthalpy.html, Nov. 23, 2009, 1 page.

P. Fauchais et al., "Plasma Spray: Study of the Coating Generation," Ceramics International, Elsevier, Amsterdam, NL, vol. 22, No. 4, Jan. 1996, pp. 295-303.

P. Fauchais et al., "Les Dépôts Par Plasma Thermique," Revue Generale De L'Electricitie, RGE. Paris, FR, No. 2, Jan. 1993, pp. 7-12.

P. Fauchais et al, "La Projection Par Plasma: Une Revue," Annales De Physique, vol. 14, No. 3, Jun. 1989, pp. 261-310.

T. Yoshida, "The Future of Thermal Plasma Processing for Coating", Pure & Appl. Chem., vol. 66, No. 6, 1994 pp. 1223-1230.

Han et al., Deformation Mechanisms and Ductility of Nanostructured Al Alloys, Mat. Res. Soc. Symp. Proc. vol. 821, Jan. 2004, Material Research Society, http://www.mrs.org/s_mrs/bin.asp?CID=2670 &DOC=FILE.PDF., 6 pages.

(56) References Cited

OTHER PUBLICATIONS

Nagai, Yasutaka, et al., "Sintering Inhibition Mechanism of Platinum Supported on Ceria-based Oxide and Pt—oxide-support Interaction,"Journal of Catalysis 242 (2006), pp. 103-109, Jul. 3, 2006, Elsevier.
"Platinum Group Metals: Annual Review 1996" (Oct. 1997). Engineering and Mining Journal, p. 63.
Subramanian, S. et al. (1991). "Structure and Activity of Composite Oxide Supported Platinum—Iridium Catalysts," *Applied Catalysts* 74: 65-81.
U.S. Appl. No. 13/291,983, filed Nov. 8, 2011, for Layman et al.
U.S. Appl. No. 12/152,084, filed May 9, 2008, for Biberger.
U.S. Appl. No. 13/028,693, filed Feb. 16, 2011, for Biberger.
U.S. Appl. No. 12/943,909, filed Nov. 10, 2010, for Layman.
U.S. Appl. No. 12/152,111, filed May 9, 2008, for Biberger et al.
U.S. Appl. No. 12/151,830, filed May 8, 2008, for Biberger et al.
U.S. Appl. No. 12/968,248, filed Dec. 14, 2010, for Biberger.
U.S. Appl. No. 12/968,245, filed Dec. 14, 2010, for Biberger.
U.S. Appl. No. 12/968,241, filed Dec. 14, 2010, for Biberger.
U.S. Appl. No. 12/968,239, filed Dec. 14, 2010, for Biberger.
U.S. Appl. No. 12/969,128, filed Dec. 15, 2010, for Biberger.
U.S. Appl. No. 12/962,463, filed Dec. 7, 2010, for Leamon.
U.S. Appl. No. 12/961,030, filed Dec. 6, 2010, for Lehman.
U.S. Appl. No. 12/961,108, filed Dec. 6, 2010, for Lehman.
U.S. Appl. No. 12/961,200, filed Dec. 6, 2010, for Lehman.
U.S. Appl. No. 12/968,253, filed Dec. 14, 2010, for Biberger.
U.S. Appl. No. 12/968,235, filed Dec. 14, 2010, for Biberger.
U.S. Appl. No. 12/969,306, filed Dec. 15, 2010, for Lehman et al.
U.S. Appl. No. 12/969,447, filed Dec. 15, 2010, for Biberger et al.
U.S. Appl. No. 12/969,087, filed Dec. 15, 2010, for Biberger.
U.S. Appl. No. 12/962,533, filed Dec. 7, 2010, for Yin et al.
U.S. Appl. No. 12/962,523, filed Dec. 7, 2010, for Yin et al.
U.S. Appl. No. 12/001,643, filed Dec. 11, 2007, for Biberger et al.
U.S. Appl. No. 12/474,081, filed May 28, 2009, for Biberger et al.
U.S. Appl. No. 12/001,602, filed Dec. 11, 2007, for Biberger et al.
U.S. Appl. No. 12/001,644, filed Dec. 11, 2007, for Biberger et al.
U.S. Appl. No. 12/969,457, filed Nov. 15, 2010, for Leamon et al.
U.S. Appl. No. 12/969,503, filed Nov. 15, 2010, for Leamon et al.
U.S. Appl. No. 12/954,813, filed Nov. 26, 2010, for Biberger.
U.S. Appl. No. 12/954,822, filed Nov. 26, 2010, for Biberger.
U.S. Appl. No. 13/033,514, filed Feb. 23, 2011, for Biberger et al.
Babin, A. et al. (1985). "Solvents Used in the Arts," *Center for Safety in the Arts*: 16 pages.
Chen, W.-J. et al. (Mar. 18, 2008). "Functional Fe3O4/TiO2 Core/Shell Magnetic Nanoparticles as Photokilling Agents for Pathogenic Bacteria," *Small* 4(4): 485-491.
Faber, K. T. et al. (Sep. 1988). "Toughening by Stress-Induced Microcracking in Two-Phase Ceramics," *Communications of the American Ceramic Society* 71(9): C-399-C401.
Ji, Y. et al. (Nov. 2002) "Processing and Mechanical Properties of Al2O3-5 vol.% Cr Nanocomposites," *Journal of the European Ceramic Society* 22(12):1927-1936.
Luo, J. et al. (2008). "Core/Shell Nanoparticles as Electrocatalysts for Fuel Cell Reactions," *Advanced Materials* 20: 4342-4347.
Park, H.-Y. et al. (May 30, 2007). "Fabrication of Magnetic Core@Shell Fe Oxide@Au Nanoparticles for Interfacial Bioactivity and Bio-Separation," *Langmuir* 23: 9050-9056.

Park, N.-G. et al. (Feb. 17, 2004). "Morphological and Photoelectrochemical Characterization of Core-Shell Nanoparticle Films for Dye-Sensitized Solar Cells: Zn—O Type Shell on SnO2 and TiO2 Cores," *Langmuir* 20: 4246-4253.
"Plasma Spray and Wire Flame Spray Product Group," located at http://www.processmaterials.com/spray.html, published by Process Materials, Inc., 2 pages.
Rahaman, R. A. et al. (1995). "Synthesis of Powders," in Ceramic Processing and Sintering. Marcel Decker, Inc., New York, pp. 71-77.
Ünal, N. et al. (Nov. 2011). "Influence of WC Particles on the Microstructural and Mechanical Properties of 3 mol% Y2O3 Stabilized ZrO2 Matrix Composites Produced by Hot Pressing," *Journal of the European Ceramic Society* (31)13: 2267-2275.
U.S. Appl. No. 13/589,024, filed Aug. 17, 2012, for Yin et al.
U.S. Appl. No. 13/801,726, filed Mar. 13, 2013, for Qi et al.
Chaim, R. et al. (2009). "Densification of Nanocrystalline $Y_2O_3$ Ceramic Powder by Spark Plasma Sintering," *Journal of European Ceramic Society* 29: 91-98.
Gangeri, M. et al. (2009). "Fe and Pt Carbon Nanotubes for the Electrocatalytic Conversion of Carbon Dioxide to Oxygenates," *Catalysis Today* 143: 57-63.
Mignard, D. et al. (2003). "Methanol Synthesis from Flue-Gas $CO_2$ and Renewable Electricity: A Feasibility Study," *International Journal of Hydrogen Energy* 28: 455-464.
Viswanathan, V. et al. (2006). "Challenges and Advances in Nanocomposite Processing Techniques," *Materials Science and Engineering* R 54: 121-285.
Ihlein, G. et al.(1998). "Ordered Porous Materials as Media for the Organization of Matter on the Nanoscale," *Applied Organometallic Chemistry* 12: 305-314.
Extended European Search Report dated Sep. 3, 2014, directed to EP Application No. 10838185.6; 7 pages.
Ahmad, K. et al. (2008). "Hybrid Nanocomposites: A New Route Towards Tougher Alumina Ceramics," *Composites Science and Technology* 68: 1321-1327.
Chau, J. K. H. et al. (2005). "Microwave Plasma Synthesis of Silver Nanopowders," *Materials Letters* 59: 905-908.
Das, N. et al. (2001). "Influence of the Metal Function in the "One-Pot" Synthesis of 4-Methyl-2-Pentanone (Methyl Isobutyl Ketone) from Acetone Over Palladium Supported on Mg(Al)O Mixed Oxides Catalysts," *Catalysis Letters* 71(3-4): 181-185.
Date, a. R. et al. (1987). "The Potential of Fire Assay and Inductively Coupled Plasama Source Mass Spectrometry for the Determination of Platinum Group Elements in Geological Materials," *Analyst* 112: 1217-1222.
Lakis, R. E. et al. (1995). "Alumina-Supported Pt-Rh Catalysts: I. Microstructural Characterization," *Journal of Catalysis* 154: 261-275.
Panchula, M. L. et al. (2003). "Nanocrystalline Aluminum Nitride: I, Vapor-Phase Synthesis in a Forced-Flow Reactor," *Journal of the American Ceramic Society* 86(7): 1114-1120.
Schimpf, S. et al. (2002). "Supported Gold Nanoparticles: In-Depth Catalyst Characterization and Application in Hydrogenation and Oxidation Reactions," *Catalysis Today* 2592: 1-16.
Wan, J. et al. (2005). "Spark Plasma Sintering of Silicon Nitride/Silicon Carbide Nanocomposites with Reduced Additive Amounts," *Scripta Materialia* 53: 663-667.

\* cited by examiner

CATALYST PRODUCTION METHOD AND SYSTEM

CROSS-REFERENCE TO RELATED APPLICATIONS

This application claims priority to U.S. Provisional Patent Application Ser. No. 61/284,329, filed Dec. 15, 2009 and entitled "MATERIALS PROCESSING," which is hereby incorporated herein by reference in its entirety as if set forth herein.

FIELD OF THE INVENTION

The present invention relates to the field of catalysts. More specifically, the present invention relates to a method of producing a catalyst.

SUMMARY OF THE INVENTION

In one aspect of the present invention, a method of producing a catalyst is provided. The method comprises mixing a plurality of catalytic particles and a solvent, thereby forming a particle-solvent mixture. A size distribution analysis is performed on a sample of the particle-solvent mixture, thereby determining a size distribution profile for the particle-solvent mixture. The mixing of the catalytic particles and the solvent in the particle-solvent mixture is repeated if the size distribution profile is below a predetermined threshold. The entire particle-solvent mixture is centrifuged if the size distribution profile is at or above the predetermined threshold, thereby forming a supernate of the particle-solvent mixture and a precipitate of the particle-solvent mixture within the same container, wherein the supernate comprises a dispersion including the catalytic particles and the solvent. The particle-solvent mixture is decanted, thereby separating the supernate from the precipitate. The particle content of a sample of the separated supernate is determined. A target volume of the dispersion to be applied to a catalyst support is determined based on one or more properties of the catalyst support. The catalyst support is impregnated with the catalytic particles in the dispersion by applying the target volume of the dispersion to the catalyst support.

In some embodiments, the method further comprises the step of calcining the impregnated catalyst support. In some embodiments, the method further comprises the step of performing a drying process on the impregnated catalyst support before the step of calcining the impregnated catalyst support. In some embodiments, the drying process is a freeze drying process.

In some embodiments, the method further comprises the step of analyzing the impregnated catalyst support to determine if it has been sufficiently impregnated according to one or more predetermined thresholds. In some embodiments, the step of analyzing the impregnated catalyst support comprises performing an Inductively Coupled Plasma Mass Spectrometry (ICP-MS) process on the impregnated catalyst support. In some embodiments, the method further comprises the step of performing an additional impregnation of the impregnated catalyst support with a dispersion of catalytic particles in response to a determination by the analyzing step that the impregnated catalyst support has not been sufficiently impregnated according to the one or more thresholds.

In some embodiments, the catalyst support is a porous extrudate. In some embodiments, the catalyst support is a monolith. In some embodiments, the catalyst support is a powder.

In some embodiments, the step of mixing the plurality of catalytic particles and the solvent comprises using a shear mixer to mix the plurality of catalytic particles and the solvent. In some embodiments, the step of mixing the plurality of catalytic particles and the solvent comprises using sonication to mix the plurality of catalytic particles and the solvent.

In some embodiments, the step of performing a size distribution analysis on the sample of the particle-solvent mixture comprises: centrifuging the sample of the particle-solvent mixture; and performing a Dynamic Light Scattering (DLS) process on the centrifuged sample.

In some embodiments, the step of determining the particle content of the sample of the separated supernate comprises calculating the weight percentage of the catalytic particles in the sample. In some embodiments, the step of determining the particle content of the sample of the separated supernate comprises performing an Inductively Coupled Plasma Mass Spectrometry (ICP-MS) process on the sample.

In some embodiments, the plurality of catalytic particles that is mixed with the solvent is a nano-powder.

In another aspect of the present invention, a method of producing a catalyst is provided. The method comprises mixing a plurality of catalytic particles and a solvent, thereby forming a particle-solvent mixture. A sample of the particle-solvent mixture is centrifuged. A Dynamic Light Scattering (DLS) process is performed on the centrifuged sample, thereby determining a size distribution profile for the particle-solvent mixture. The mixing of the catalytic particles and the solvent in the particle-solvent mixture is repeated if the size distribution profile is below a predetermined threshold. The entire particle-solvent mixture is centrifuged if the size distribution profile is at or above the predetermined threshold, thereby forming a supernate of the particle-solvent mixture and a precipitate of the particle-solvent mixture within the same container, wherein the supernate comprises a dispersion including the catalytic particles and the solvent. The particle-solvent mixture is decanted, thereby separating the supernate from the precipitate. The catalyst support is impregnated with the catalytic particles in the dispersion by applying a volume of the dispersion to the catalyst support.

In some embodiments, the method further comprises performing a dry-down process on a sample of the separated dispersion, and performing a weight percentage calculation of the catalytic particles using the dried-down sample of the separated dispersion, thereby determining a weight percentage for the catalytic particles. In some embodiments, the step of impregnating the catalyst support is performed only if the determined weight percentage for the catalytic particles is at or above a predetermined threshold. In some embodiments, an Inductively Coupled Plasma Mass Spectrometry (ICP-MS) process is performed on the dried-down sample of the separated dispersion.

In yet another aspect of the present invention, a method of producing a catalyst is provided. The method comprises providing a dispersion, wherein the dispersion comprises catalytic particles dispersed in a solvent. A target volume of the dispersion to be applied to a catalyst support is determined based on one or more properties of the catalyst support. The catalyst support is impregnated with the catalytic particles in the dispersion by applying the target volume of the dispersion to the catalyst support. A drying process is performed on the impregnated catalyst support. The dried impregnated catalyst support is calcined. An Inductively Coupled Plasma Mass Spectrometry (ICP-MS) process is performed on the calcined impregnated catalyst support to determine if it has been sufficiently impregnated according to one or more predetermined thresholds. An additional impregnation of the impregnated catalyst support with a dispersion of catalytic particles is performed if it is determined by the ICP-MS process that the impregnated catalyst support has not been sufficiently impregnated according to the one or more thresholds.

In some embodiments, the catalyst support is a porous extrudate. In some embodiments, the catalyst support is a monolith. In some embodiments, the catalyst support is a powder.

In some embodiments, the drying process is a freeze drying process. In some embodiments, the drying process is either a hot drying process or a flash drying process.

DETAILED DESCRIPTION OF THE INVENTION

The following description is presented to enable one of ordinary skill in the art to make and use the invention and is provided in the context of a patent application and its requirements. Various modifications to the described embodiments will be readily apparent to those skilled in the art and the generic principles herein may be applied to other embodiments. Thus, the present invention is not intended to be limited to the embodiment shown but is to be accorded the widest scope consistent with the principles and features described herein.

This disclosure refers to both particles and powders. These two terms are equivalent, except for the caveat that a singular "powder" refers to a collection of particles. The present invention may apply to a wide variety of powders and particles. Powders that fall within the scope of the present invention may include, but are not limited to, any of the following: (a) nano-structured powders (nano-powders), having an average grain size less than 250 nanometers and an aspect ratio between one and one million; (b) submicron powders, having an average grain size less than 1 micron and an aspect ratio between one and one million; (c) ultra-fine powders, having an average grain size less than 100 microns and an aspect ratio between one and one million; and (d) fine powders, having an average grain size less than 500 microns and an aspect ratio between one and one million.

Various aspects of the disclosure may be described through the use of flowcharts. Often, a single instance of an aspect of the present disclosure may be shown. As is appreciated by those of ordinary skill in the art, however, the protocols, processes, and procedures described herein may be repeated continuously or as often as necessary to satisfy the needs described herein. Additionally, it is contemplated that certain method steps of the invention can be performed in alternative sequences to those disclosed in the flowcharts. Accordingly, the scope of the claims should not be limited to any specific order of method steps unless the order is explicitly required by the language of the claims.

Figure 1:
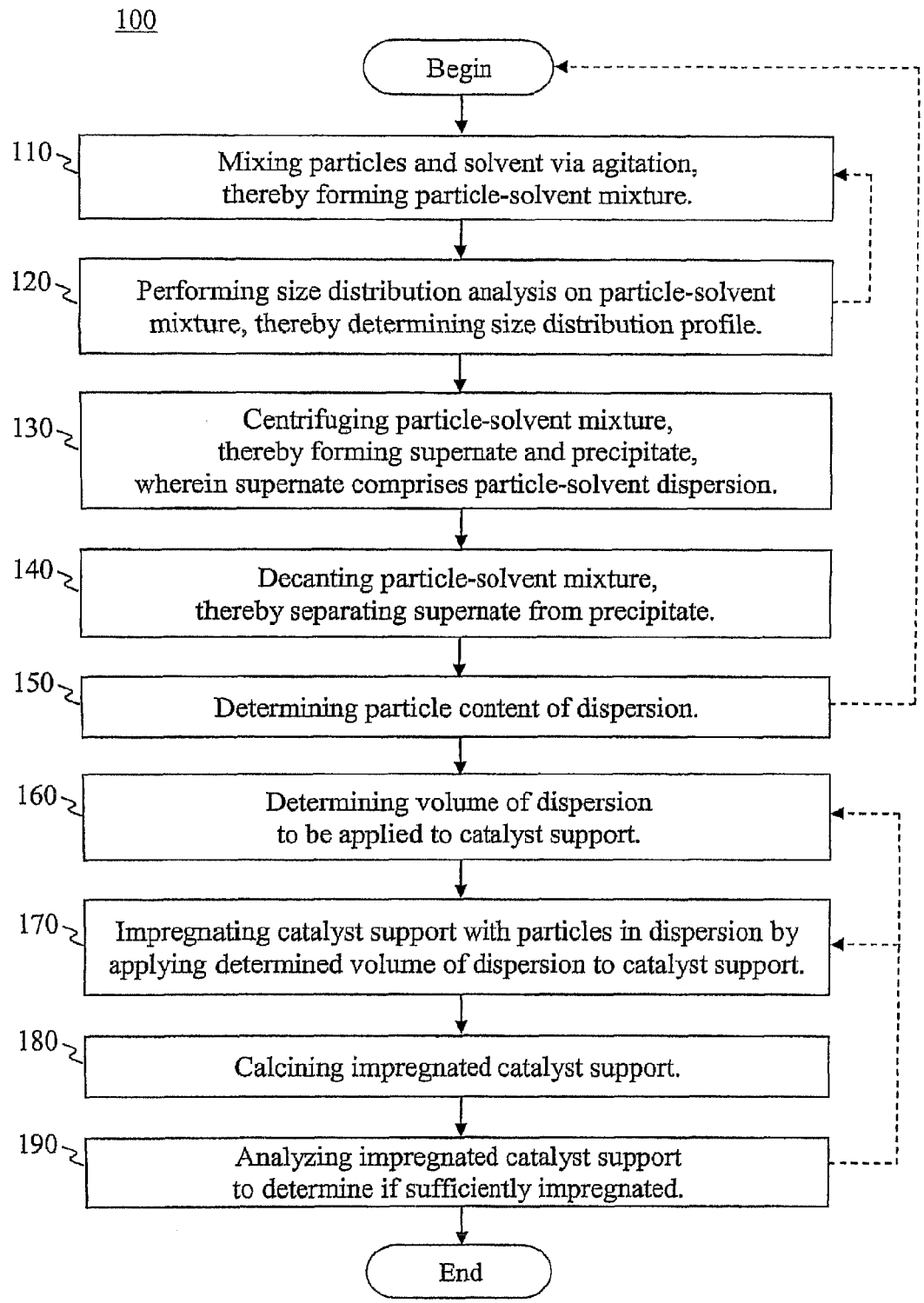
FIG. 1 illustrates one embodiment of a method of producing a catalyst in accordance with the principles of the present invention.

FIG. 1 illustrates one embodiment of a method 100 of producing a catalyst in accordance with the principles of the present invention.

At step 110, a plurality of catalytic particles and a solvent are mixed together, thereby forming a particle-solvent mixture. It is contemplated that the catalytic particles can be made up of any particles having catalytic properties such that they modify, either by increasing or decreasing, the rate of a chemical reaction. In some embodiments, the catalytic particles comprise or consist of one or more precious metals. In some embodiments, the catalytic particles comprise one of the platinum group metals, such as ruthenium, rhodium, palladium, osmium, iridium, and platinum. However, other catalytic particles can be used as well. A variety of different solvents can be used as well, including, but not limited to, water, cyclohexane, and toluene. In a preferred embodiment, the particles and the solvent are mixed via some form of agitation. In some embodiments, shear mixing is used to mix the particles and the solvent. In some embodiments, sonication is used to mix the particles and the solvent.

At step 120, a size distribution analysis is performed on a sample of the particle-solvent mixture. This analysis results in the determination of a size distribution profile for the particle-solvent mixture. In some embodiments, this size distribution analysis comprises centrifuging the sample of the particle-solvent mixture, and performing a Dynamic Light Scattering (DLS) process on the centrifuged sample. If the size distribution profile of the sample is below a predetermined threshold, then the catalytic particles and the solvent in the particle-solvent mixture are mixed again at step 110, as shown by the dotted arrow.

Once the size distribution profile is at or above the predetermined threshold (whether it is after the original mixing step or after subsequent repeated mixing steps) the entire particle-solvent mixture is centrifuged at step 130, thereby forming a supernate of the particle-solvent mixture and a precipitate of the particle-solvent mixture within the same container. The supernate comprises a dispersion that includes the catalytic particles and the solvent.

At step 140, the particle-solvent mixture is decanted. This decanting step separates the supernate from the precipitate.

At step 150, the particle content of a sample of the separated supernate is determined. In some embodiments, this particle content determination comprises performing a weight percentage calculation of the catalytic particles in the separated dispersion. In some embodiments, this particle content determination comprises performing an Inductively Coupled Plasma Mass Spectrometry (ICP-MS) process on the separated dispersion. In some embodiments, this particle content determination comprises performing both the weight percentage calculation and the ICP-MS process. In some embodiments, the process goes back to the beginning if the particle content does not meet a predetermined threshold, as shown by the dotted arrow. In some embodiments, additional catalytic particles are added to and mixed with the dispersion at step 110 if the particle content does not meet a predetermined threshold. In some embodiments, completely new particles and solvent are used to form a completely new dispersion.

At step 160, a target volume of the dispersion to be applied to a catalyst support is determined based on one or more properties of the catalyst support. Such properties include, but are not limited to, the size of the support, the shape of the support, and the type of support (e.g., whether it is an extrudate, a powder, or a monolith).

At step 170, the catalyst support is impregnated with the catalytic particles in the dispersion. This impregnation is accomplished by applying the target volume of the dispersion to the catalyst support. In some embodiments, the application of the dispersion to the catalyst support is repeated in order to sufficiently impregnate the support. In some embodiments, this repetition is predetermined by the previously determined particle content of the supernate and/or properties of the catalyst support.

In some embodiments, the process continues to step 180, where the impregnated catalyst support is calcined. It has been found to be advantageous for calcination to be performed between 350 degrees Celsius and 550 degrees Celsius for one to three hours. However, other temperatures and times can be employed as well, with variance of the temperature and time depending on the properties of the catalytic particles and/or the catalyst support.

At step 190, the impregnated catalyst support is analyzed to determine if it has been sufficiently impregnated according to one or more predetermined thresholds. In some embodiments, this analysis comprises performing an Inductively Coupled Plasma Mass Spectrometry (ICP-MS) process on the impregnated catalyst support. In some embodiments, the process repeats the impregnation of the catalyst support at step 170 if the threshold is not met. In some embodiments, such repetition of the impregnation step requires determining the appropriate volume of the dispersion to be applied to the catalyst support at step 160. If the threshold is met, then the catalyst has been properly produced and the process comes to an end.

Figure 2A:
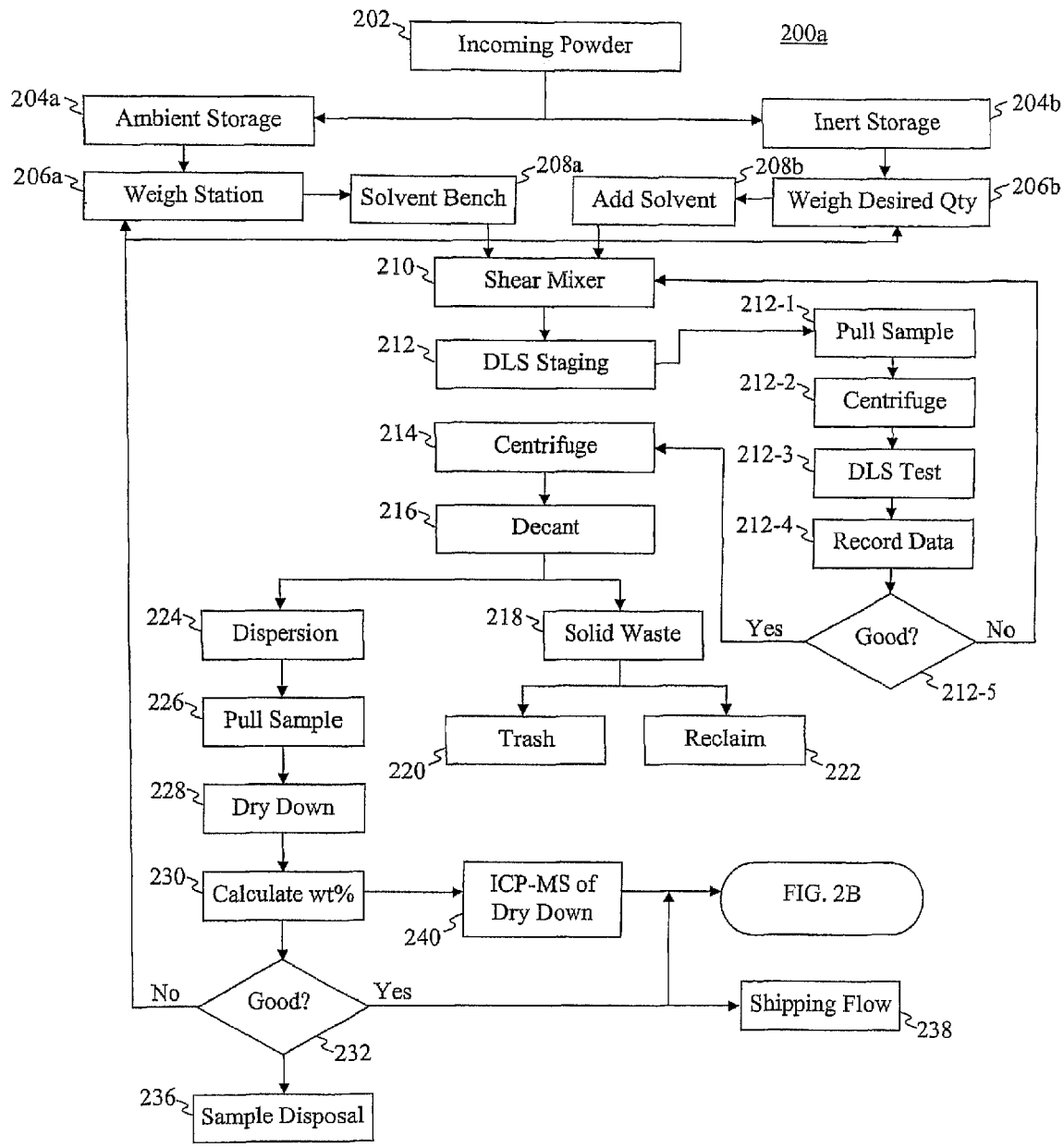
FIG. 2A illustrates one embodiment of a method of producing a dispersion in accordance with the principles of the present invention.

FIG. 2A illustrates one embodiment of a method 200*a* of producing a dispersion in accordance with the principles of the present invention. FIG. 2A provides a more detailed embodiment of steps 110 to 150 of FIG. 1. Accordingly, method 200*a* comprises all of the features discussed above with respect to FIG. 1.

At step 202, an incoming powder is provided. In a preferred embodiment, the powder comprises catalytic particles. In some embodiments, the powder consists only of catalytic particles. The powder can either be stored and handled in an ambient environment or in an inert environment.

At step 204*a*, the powder goes through ambient storage. For example, the powder may be placed in a bottle on a shelf. The powder is then weighed at a weight station at step 206*a*. A solvent bench is then used to add solvent to the powder at step 208*a*. Steps 206*a* and 208*a* occur in open air.

Alternatively, the powder goes through inert storage at step 204*b*. A desired quantity of the powder is weighed at a weigh station at step 206*b*. A solvent bench is then used to add solvent to the powder at step 208*b*. Steps 206*b* and 208*b* occur in an inert environment in a dry box or glove box. In some embodiments, a noble gas, such as argon, is introduced into the box to create and maintain a very high purity inert atmosphere within the box. This inert atmosphere is particularly helpful in handling titanium carbide or pure metal powder.

At step 210, the powder and the solvent that were introduced to each other at step 208 are mixed together using a shear mixer, thereby producing a particle-solvent mixture. As previously mentioned, the powder and the solvent can be mixed together using other forms of agitation as well. In some embodiments, the powder and the solvent are mixed together using sonication.

At step 212, the particle-solvent mixture is put through DLS staging in order to determine the dispersion quality of the particle-solvent mixture. At step 212-1 of the DLS staging, a sample is pulled from the mixture. At step 212-2 of the DLS staging, the sample is centrifuged. At step 212-3 of the DLS staging, a DLS test is performed on the centrifuged sample in order to determine the size distribution of the small particles in the mixture. At step 212-4, the data from the DLS test is recorded. At step 212-5, it is determined whether or not the dispersion quality of the sample is sufficient. If the dispersion quality is not sufficient, then the process repeats the mixing step at 210 in order to improve the size distribution of the small particles.

If the dispersion quality is sufficient, then the process continues to step 214, where the entire vat of the dispersion mixture is put into a large centrifuge, which rapidly ages the dispersion. In a preferred embodiment, the mixture is spun at about 2500 rpms. All of the large particles settle to the bottom in pellet form, thereby resulting in a supernate that is a good dispersion and that is going to remain stable for numerous days to weeks.

At step 216, the supernate is decanted off, thereby removing the good dispersion from the large precipitate. At step 218, the precipitate is treated as solid waste. In some embodiments, the precipitate is trashed at step 220 if it is a non-precious metal and reclaimed at step 222 if it is a precious metal.

At step 224, the decanted supernate is used as the dispersion for the rest of the process. At step 226, a sample of the dispersion is pulled. The sample is then dried down at step 228, which allows for the calculation of the weight percentage of the catalytic particles in the sample at step 230. In the middle of getting the dry down, an ICP-MS process is performed on the sample at step 240. The ICP-MS process determines the total metal content in the dispersion.

At step 232, it is determined whether or not the calculated weight percentage is sufficient. If the weight percentage is not sufficient, then the process starts over at one of the powder weighing steps at 206*a* or 206*b*. If the weight percentage is sufficient, then the process continues on to formation of the catalyst shown in FIG. 2B. In some embodiments, if the weight percentage is sufficient, then the powder goes to the shipping department at step 238. In some embodiments, the pulled sample is disposed of at step 236 no matter what the determination is at step 232, i.e., whether or not the weight percentage is sufficient.

Figure 2B:
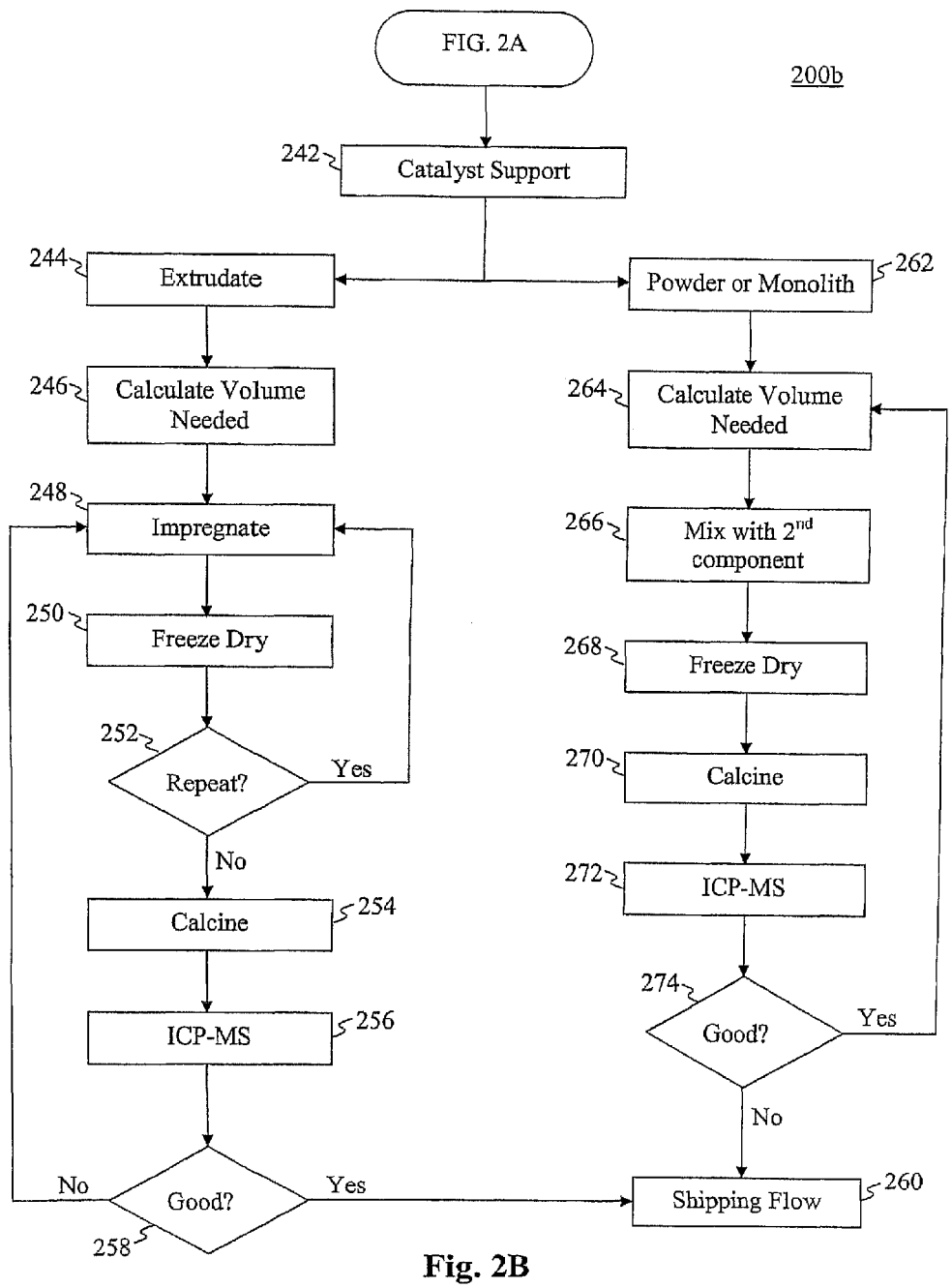
FIG. 2B illustrates one embodiment of a method of impregnating a catalyst support with particles from a dispersion in accordance with the principles of the present invention.

FIG. 2B illustrates one embodiment of a method 200*b* of impregnating a catalyst support with particles from a dispersion in accordance with the principles of the present invention. FIG. 2B provides a more detailed embodiment of steps 160 to 190 of FIG. 1. Accordingly, method 200*b* comprises all of the features discussed above with respect to FIG. 1. Additionally, it is contemplated that, in some embodiments, the steps of method 200*b* are performed in an inert environment where possible with the dispersion being inertly stored.

At step 242, a catalyst support is selected to receive the catalytic particles from the dispersion produced in FIG. 2A. In some embodiments, the catalytic particles will either be impregnated onto a porous extrudate, coated onto a micron powder or macro powder of sorts, or coated onto a monolith.

At step 244, an extrudate is selected to act ast the catalyst support. Different extrudates have different internal volumes and different pore sizes. Therefore, it is important to know the internal volume in order to calculate how much dispersion to add into the extrudate at step 246. For example, if it is determined that an extrudate has an internal volume of 0.52 ml per gram and that there is 100 grams of extrudate material, then it can be determined exactly how much dispersion to add to the extrudate in order take up the entire pore space. If you add any more than the determined amount, then you are past the incipient wetness. If you add any less, then you are not accessing all of the possible pores. Therefore, it is important to add just the right amount of the dispersion.

At step 248, the extrudate is impregnated with the catalytic particles of the dispersion. It is contemplated that the impregnation of the extrudate can be performed in a variety of ways. In some embodiments, one or more extrudates are placed in a laboratory flask that has a first neck with an opening and a second neck with an opening. A rubber stopper is used to seal the opening of the first neck, while a vacuum pump is hooked up to the opening of the second neck. A vacuum is pulled on the extrudates in the flask down to approximately less than 500 microns. In some embodiments, the vacuum is pulled for a time between approximately 10 minutes and approximately 20 minutes, depending on how many extrudates are in the flask and their total mass. Pulling the vacuum on the extrudates gets the interior volume of the flask down to a certain pressure that enables a rapid impregnation. Pulling a vacuum removes all of the air from the internal pores of the extrudates, which allows a liquid to penetrate the pores more rapidly. As a result of pulling the vacuum, we are left with one or more dry extrudates sitting at the bottom of the flask. The vacuum is closed off, such as through the use of one or more valves. A syringe is used to inject the previously determined volume of dispersion into the flask. In some embodiments, the syringe is used to puncture the rubber stopper and then to inject the dispersion. Preferably, no action is performed on the extrudates for 10 to 15 minutes in order to make sure that the entire extrudate has the opportunity to be impregnated.

Different techniques can be used depending on what you want the end product to be. For example, if you want an eggshell extrudate where it is mostly coating on the outside, you can break the vacuum quickly or you can avoid pulling the vacuum at all. If you want to make sure that there is uniform coating all the way to the interior of the extrudate, you can let it sit a little bit longer to make sure that the entire extrudate has a chance to be impregnated.

At step 250, a freeze-drying process is performed on the impregnated catalyst support. If the flask discussed above is used, then the vacuum is broken by pulling the rubber septum off. Liquid nitrogen is poured into the flask, which is different from what is traditionally done.

Traditionally, if you want to freeze dry something, you start off with a liquid in a flask and put it into a dewar of liquid nitrogen. You try to create as much surface area as you freeze the material on the inside of the flask. Once it is frozen, you hook it up to a freeze dryer. However, since you have a lot of liquid that is on the interior of these extrudates, you cannot freeze them very quickly by just setting the flask into a liquid nitrogen dewar. It takes too long.

Instead, in the present invention, liquid nitrogen is poured into the flask, letting everything freeze. Then, all of the liquid nitrogen is allowed to boil off into nitrogen. When there is no more liquid in the flask, the flask is hooked up to a freeze dryer. In some embodiments, the freeze dryer is just a strong pump that pulls strong enough to keep the material inside the flask frozen. It pulls all of the solvent, such as water in most cases, directly past the cold finger (at −50 to −80 degrees Celsius) so that all of the vapor condenses off of the cold finger in order to avoid any damage to the pump.

It is important to pull a strong enough vacuum to keep the material inside the flask frozen. The sublimation rate has to be that at which the material stays frozen throughout the entire process. In order to make sure that happens, when you first start off with the freeze drying, usually you insulate the flask a little bit and let a strong vacuum be pulled on it. As you notice the flask not being as cold as it used to be, you start removing a little bit of insulation. It is all finished when you still have that strong of a vacuum and your flask is at room temperature so you know that nothing else can be sublimed.

At step 252, it is determined whether or not the impregnation should be repeated. For example, if you need a highly loaded catalyst (e.g., 10% platinum) on the extrudate, you might have to repeat the impregnation process a couple of times because the dispersion might not be as concentrated as it needs to be to require only one exposure. In some embodiments, this determination is based on the ICP-MS process performed at step 240. If it is determined that another impregnation is required, then the process repeats the impregnation at step 248. In some embodiments, a volume of dispersion is calculated once again at step 246 before proceeding to the impregnation step 248.

If it is determined that another impregnation is not required, then the impregnated extrudates are calcined at step 254. At this stage, the extrudates are already dry. The calcination step is a hardening step, performed to adhere the catalytic particles to the support. Calcination preferably occurs between 350 and 550 degrees Celsius for 1 to 3 hours. Depending on the type of metal, the temperature and the heating time can be varied.

At step 256, an ICP-MS process is performed on a sample of the impregnated extrudate in order to get elemental analysis on it and to make sure that there is sufficient loading. At step 258, it is determined whether or not there is sufficient loading on the catalyst support. If there is not sufficient loading, then the process repeats the impregnation of the support at step 248. If there is sufficient loading, then the impregnated supports go to the shipping department at step 260.

In some embodiments, instead of an extrudate, a powder or a monolith is used as the catalyst support at step 262. At step 264, after massing out a certain amount of powder or the monolith that you want coated with the catalytic particles, you calculate the volume that you need to sufficiently impregnate the support, similar to step 246.

At step 266, you mix the support with a second component, which is the dispersion. In some embodiments, this dispersion comprises catalytic nano-particles dispersed in a liquid. That dispersion is mixed with the support, whether it be a macro support, a micron powder, or a monolith. This mixing step serves to impregnate the support with the catalytic particles.

At step 268, a freeze-drying process is performed on the impregnated support, such as in step 250. However, it is contemplated that other drying processes can be used instead of freeze-drying, such as hot drying or flash drying. A hot drying process comprises any way to remove the solvent at a temperature greater than room temperature, but not hotter than the calcining temperature. For example, if you want to remove water, you can use a hot drying step at 110 degrees Celsius at ambient pressure and just let it bake for 1 to 2 hours until the material is dry. A flash drying process comprises anything that removes the solvent at a temperature that is as hot or hotter than the calcining temperature. For example, a furnace can be set at 550 degrees Celsius. The impregnated mixture is then placed into the furnace. The solvent evaporates quick enough so that you limit the capillary forces of the solvent evaporating, allowing you to freeze material in that spot or secure material in that location more readily than you can if you use a slow hot drying process. In some embodiments, the hot drying process or the flash drying process is used in place of the freeze-drying process at step 250 and/or at step 268.

At step 270, the support is calcined, as in step 254. An ICP-MS process is then performed on a sample of the support at step 272 in order to get elemental analysis on it and to make sure that there is sufficient loading. At step 274, it is determined whether or not there is sufficient loading on the catalyst support. If there is not sufficient loading, then the process repeats the impregnation of the support. In some embodiments, this repeated impregnation begins with a recalculation of the volume needed to sufficiently impregnate the support at step 264. In some embodiments, the repeated impregnation step goes directly to the mixing of the support with a volume of the dispersion at step 266. If there is sufficient loading, then the impregnated supports go to the shipping department at step 260.

In the present invention, one or more properties of the catalyst support are used in order to determine the proper amount of dispersion to use in impregnating the support. Determining the internal volume of the extrudate is particularly useful, as you do not want to use any more or any less dispersion than that internal volume. If you use any more than that internal volume, then you risk capillary forces drawing material out of the extrudate. If you use any less than that internal volume, then you are not accessing all of the pores, and therefore, not giving yourself the best chance of impregnation. The present invention also uses the ICP-MS process before the impregnation steps in order to determine the appropriate number of impregnations to be performed.

In some embodiments where a ceramic monolith is used for the catalyst support, the monolith is dipped into the dispersion, but a freeze-drying process is not used. Instead, a hot drying process or a flash drying process is used.

In some embodiments, impregnated extrudates can be used to impregnate a monolith. For example, if it is determined at step 258 that there is sufficient loading on the extrudates, then these impregnated extrudates can be used to impregnate a monolith, since the extrudates are coated with catalytic particles on the inside. The extrudates are crushed up into powder (e.g., 10 micron powder or 40 micron powder). This crushed up powder contains the catalytic particles. The powder is then put into a slurry, which is used to coat the monolith.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of producing a catalyst, wherein the method comprises:
    mixing a plurality of catalytic particles in nano-powder form and a solvent, thereby forming a particle-solvent mixture;
    performing a size distribution analysis on a supernatant sample of the particle-solvent mixture, thereby determining a size distribution profile for the particle-solvent mixture;
    repeating the mixing of the catalytic particles and the solvent in the particle-solvent mixture if the size distribution profile is below a predetermined threshold;
    centrifuging the particle-solvent mixture if the size distribution profile is at or above the predetermined threshold, thereby forming a supernate of the particle-solvent mixture and a precipitate of the particle-solvent mixture within the same container, wherein the supernate comprises a dispersion including the catalytic particles and the solvent;
    decanting the particle-solvent mixture, thereby separating the supernate from the precipitate;
    determining the particle content of a sample of the separated supernate;
    determining a target volume of the dispersion to be applied to a catalyst support based on one or more properties of the catalyst support; and
    impregnating the catalyst support with the catalytic particles in the dispersion by applying the target volume of the dispersion to the catalyst support.

2. The method of claim 1, further comprising the step of calcining the impregnated catalyst support.

3. The method of claim 2, further comprising the step of performing a drying process on the impregnated catalyst support before the step of calcining the impregnated catalyst support.

4. The method of claim 3, wherein the drying process is a freeze drying process.

5. The method of claim 1, further comprising the step of analyzing the impregnated catalyst support to determine if it has been impregnated according to one or more predetermined thresholds.

6. The method of claim 5, wherein the step of analyzing the impregnated catalyst support comprises performing an Inductively Coupled Plasma Mass Spectrometry (ICP-MS) process on the impregnated catalyst support.

7. The method of claim 5, further comprising the step of performing an additional impregnation of the impregnated catalyst support with a dispersion of catalytic particles in response to a determination by the analyzing step that the impregnated catalyst support has not been impregnated according to the one or more thresholds.

8. The method of claim 1, wherein the catalyst support is a porous extrudate.

9. The method of claim 1, wherein the catalyst support is a monolith.

10. The method of claim 1, wherein the catalyst support is a powder.

11. The method of claim 1, wherein the step of mixing the plurality of catalytic particles and the solvent comprises using a shear mixer to mix the plurality of catalytic particles and the solvent.

12. The method of claim 1, wherein the step of mixing the plurality of catalytic particles and the solvent comprises using sonication to mix the plurality of catalytic particles and the solvent.

13. The method of claim 1, wherein the step of performing a size distribution analysis on the supernatant sample of the particle-solvent mixture comprises:
    centrifuging the sample of the particle-solvent mixture; and
    performing a Dynamic Light Scattering (DLS) process on the centrifuged sample supernate.

14. The method of claim 1, wherein the step of determining the particle content of the sample of the separated supernate comprises calculating the weight percentage of the catalytic particles in the sample.

15. The method of claim 1, wherein the step of determining the particle content of the sample of the separated supernate comprises performing an Inductively Coupled Plasma Mass Spectrometry (ICP-MS) process on the sample.

16. A method of producing a catalyst, wherein the method comprises:
    mixing a plurality of catalytic particles in nano-powder form and a solvent, thereby forming a particle-solvent mixture;
    centrifuging a sample of the particle-solvent mixture;
    performing a Dynamic Light Scattering (DLS) process on the centrifuged sample supernate, thereby determining a size distribution profile for the particle-solvent mixture;

repeating the mixing of the catalytic particles and the solvent in the particle-solvent mixture if the size distribution profile is below a predetermined threshold;

centrifuging the particle-solvent mixture if the size distribution profile is at or above the predetermined threshold, thereby forming a supernate of the particle-solvent mixture and a precipitate of the particle-solvent mixture within the same container, wherein the supernate comprises a dispersion including the catalytic particles and the solvent;

decanting the particle-solvent mixture, thereby separating the supernate from the precipitate; and impregnating the catalyst support with the catalytic particles in the dispersion by applying a volume of the dispersion to the catalyst support.

17. The method of claim 16, further comprising:

drying down a sample of the separated dispersion; and performing a weight percentage calculation of the catalytic particles using the dried-down sample of the separated dispersion, thereby determining a weight percentage for the catalytic particles.

18. The method of claim 17, wherein the step of impregnating the catalyst support is performed only if the determined weight percentage for the catalytic particles is at or above a predetermined threshold.

19. The method of claim 17, further comprising the step of performing an Inductively Coupled Plasma Mass Spectrometry (ICP-MS) process on the dried-down sample of the separated dispersion.

20. A method of producing a catalyst, wherein the method comprises:

mixing a plurality of catalytic particles in nano-powder form and a solvent, thereby forming a particle-solvent mixture performing a size distribution analysis on a supernatant sample of the particle-solvent mixture, thereby determining a size distribution profile for the particle-solvent mixture;

centrifuging the particle-solvent mixture if the size distribution profile is at or above a predetermined threshold, thereby forming a supernate of the particle-solvent mixture and a precipitate of the particle-solvent mixture within the same container, wherein the supernate comprises a dispersion including the catalytic particles and the solvent;

determining a target volume of the dispersion to be applied to a catalyst support based on one or more properties of the catalyst support;

impregnating the catalyst support with the catalytic particles in the dispersion by applying the target volume of the dispersion to the catalyst support;

performing a drying process on the impregnated catalyst support;

calcining the dried impregnated catalyst support;

performing an Inductively Coupled Plasma Mass Spectrometry (ICP-MS) process on the calcined impregnated catalyst support to determine if it has been impregnated according to one or more predetermined thresholds; and performing an additional impregnation of the impregnated catalyst support with a dispersion of catalytic particles if it is determined by the ICP-MS process that the impregnated catalyst support has not been impregnated according to the one or more thresholds.

21. The method of claim 20, wherein the catalyst support is a porous extrudate.

22. The method of claim 20, wherein the catalyst support is a monolith.

23. The method of claim 20, wherein the catalyst support is a powder.

24. The method of claim 20, wherein the drying process is a freeze drying process.

25. The method of claim 20, wherein the drying process is either a hot drying process or a flash drying process.

* * * * *